(12) United States Patent
Abe et al.

(10) Patent No.: US 8,218,289 B2
(45) Date of Patent: Jul. 10, 2012

(54) ELECTROLYTIC CAPACITOR AND ELECTRIC EQUIPMENT PROVIDED THEREWITH

(75) Inventors: Isao Abe, Yokohama (JP); Kenichi Asami, Sagamihara (JP); Hajime Osaki, Yokosuka (JP); Yoshiyuki Matsunaga, Kawasaki (JP); Hideo Kozuka, Yokosuka (JP)

(73) Assignee: Toshiba Lighting & Technology Corporation, Kanagawa-ken (JP)

( * ) Notice: Subject to any disclaimer, the term of this patent is extended or adjusted under 35 U.S.C. 154(b) by 237 days.

(21) Appl. No.: 12/694,477

(22) Filed: Jan. 27, 2010

(65) Prior Publication Data

US 2010/0195271 A1 Aug. 5, 2010

(30) Foreign Application Priority Data

Jan. 30, 2009 (JP) ................................ 2009-019854

(51) Int. Cl.
*H01G 9/08* (2006.01)

(52) U.S. Cl. ........ 361/519; 361/517; 361/516; 361/523; 361/525; 361/528

(58) Field of Classification Search .................. 361/519, 361/516–517, 523–525, 528–529, 530, 540–541
See application file for complete search history.

(56) References Cited

U.S. PATENT DOCUMENTS

| | | | | |
|---|---|---|---|---|
| 4,546,415 A | * | 10/1985 | Kent et al. | 361/511 |
| 6,052,273 A | * | 4/2000 | Inoue et al. | 361/523 |
| 6,128,179 A | * | 10/2000 | Morokuma | 361/517 |
| 6,201,686 B1 | * | 3/2001 | Hiratsuka et al. | 361/502 |
| 6,307,732 B1 | * | 10/2001 | Tsubaki et al. | 361/509 |
| 6,690,573 B2 | * | 2/2004 | Honda et al. | 361/509 |

FOREIGN PATENT DOCUMENTS

| | | |
|---|---|---|
| JP | 2005-044868 | 2/2005 |
| JP | 2006-286969 | 10/2006 |
| JP | 2010027887 | * 2/2010 |

OTHER PUBLICATIONS

English language abstract of JP-2005-044868.
Machine English language translation of JP-2005-044868.
English language abstract of JP-2006-286969.
Machine English language translation of JP-2006-286969.

* cited by examiner

*Primary Examiner* — Nguyen T Ha
(74) *Attorney, Agent, or Firm* — DLA Piper LLP (US)

(57) ABSTRACT

An electrolytic capacitor includes: a case including a case body, in which an electrolytic capacitor element is disposed in a sealed manner and filled up with an electrolytic solution, and a safety valve is mounted to the case body for jetting an evaporated gas of the electrolytic solution filling the electrolytic capacitor element; a cover member mounted to the case so as to cover the safety valve provided for the case; a first fixing unit mounted to the cover member so as to prevent the cover member from dismounting when the evaporated gas of the electrolytic solution is jetted outward; and a second fixing unit disposed in association with the first fixing unit and adopted to reinforce and assist a function of the first fixing unit to thereby prevent the cover member from being dismounted. An electric equipment includes a lighting circuit including circuit components, and an electrolytic capacitor of the structure mentioned above.

4 Claims, 24 Drawing Sheets

ELECTROLYTIC CAPACITOR AND ELECTRIC EQUIPMENT PROVIDED THEREWITH

BACKGROUND OF THE INVENTION

1. Field of the Invention

The present invention relates to an electrolytic capacitor and an electric equipment or instrument having an electrical circuit using the electrolytic capacitor.

2. Description of the Related Art

Conventionally, the electric equipment includes a lighting apparatus lighting a discharge lamp, which generally includes a filter circuit, a rectifying/smoothing circuit, a high frequency conversion circuit, a lamp lighting circuit, and the like. In such lighting apparatus, the rectifying/smoothing circuit is connected to an electrolytic capacitor for smoothing a direct-current power supply.

The electrolytic capacitor is housed in a bottomed cylindrical case and sealed in a manner such that an electrolytic capacitor element including a pair of electrodes made of an anode foil and a cathode foil wound with an electrolytic paper sandwiched therebetween is immersed in an electrolyte solution and a sealing rubber is attached to the immersed electrolytic capacitor element.

According to aged deterioration of the electrolytic capacitor, the electrolyte solution thereof is reduced by evaporation. At the end of life, the reduction in electrolyte solution causes a reduction in capacitance as well as an increase in equivalent series resistance (ESR) of the electrolyte solution, leading to an increase in temperature. Subsequently, ripple current causes an increase in heat generation, leading to thermal runaway, and a sudden increase in temperature, exceeding the boiling point of the electrolyte solution, resulting in generation of gas evaporated from the electrolyte solution. Pressure of the evaporation gas may cause the case to burst. In view of this matter, a safety valve may be disposed in a portion of the case.

When the pressure in the case exceeds a predetermined pressure due to the gas evaporated from the electrolyte solution, the safety valve is actuated to release or jet out the gas externally so as to prevent the case from bursting. Actuation of the safety valve is a normal operation for the purpose of suppressing an abnormal increase in pressure built up in the case. However, since the gas released to outside is seen as smoke, the user may incorrectly identify the gas as smoke due to burning damage and tends to incorrectly determines that a fire has occurred.

In order to prevent such a problem, there has been conventionally proposed an electrolytic capacitor such as disclosed in Japanese Patent Application Laid-Open Publication No. 2005-44868 (Patent Document 1) which includes an outer airtight unit storing gas released to outside from the safety valve and an electrolytic capacitor disclosed in Japanese Patent Application Laid-Open Publication No. 2006-286969 (Patent Document 2) to which a cap including a accommodation portion, a vertical extensible (expansion and contraction) portion, and an annular extensible (expansion and contraction) portion is mounted.

However, the electrolytic capacitor disclosed in the Patent Document 1 has a structure in which an outer airtight unit is locked to a metal case by hooking an opening end of the outer airtight unit to a stepped portion between an upper portion with a large diameter and a lower portion with a small diameter in the metal case.

The electrolytic capacitor disclosed in the Patent Document 2 uses the annular extensible portion including an annular rubber or the like to attach the cap to the metal case by the contraction thereof.

However, according to such conventional structures mentioned above for locking the outer airtight unit and the other for attaching the cap, it was not enough to deal with the release force of the gas evaporated from the electrolyte solution, and the outer airtight unit and the cap may be detached from the metal case by the release force of the evaporated gas.

SUMMARY OF THE INVENTION

The present invention was conceived in consideration of circumstances encountered in the prior art mentioned above and an object of the present invention is to provide an electrolytic capacitor and electric equipment including the electrolytic capacitor capable of securely attaching, to the case, a cover member for air-tightly covering and sealing the gas evaporated from an electrolyte solution.

The above and other objects can be achieved according to the present invention by providing, in one aspect, an electrolytic capacitor comprising:

a case including a case body, in which an electrolytic capacitor element is disposed in a sealed manner and filled up with an electrolytic solution, and a safety valve is mounted to the case body for jetting an evaporated gas of the electrolytic solution filling the electrolytic capacitor element;

a cover member mounted to the case so as to cover the safety valve provided for the case;

a first fixing unit mounted to the cover member so as to prevent the cover member from dismounting when the evaporated gas of the electrolytic solution is jetted outward; and a second fixing unit disposed in association with the first fixing unit and adopted to reinforce and assist a function of the first fixing unit to thereby prevent the cover member from being dismounted.

It is to be noted that, in this aspect, in the following description of the present invention, the definition and technical meaning of the terms to be used above are as follows unless otherwise specified.

That is, the safety valve is not particularly limited to a shape and a disposed location as long as the safety valve has a function to release gas evaporated from the electrolyte solution when an internal pressure of the case body exceeds a predetermined pressure.

In addition, the cover member of the safety valve may be made of a material such as a silicone resin, but is not particularly limited to the material.

In the above aspect, the cover member has an opening portion, the first fixing unit is a ring-shaped member fixing the cover member to the case so as to be tightened from the peripheral side, and the second fixing unit is a thick wall portion formed on a peripheral edge of the opening portion.

The ring-shaped member may be made of a synthetic resin or a metal material, and the shape thereof may include a C-shape. Further, the ring-shaped member may be formed so as to wind the cover member from the peripheral side using a band-shaped metal fitting or a wire.

According to the present invention of the structure of the above first aspect, basically, the ring-shaped member serving as the first fixing unit can prevent or suppress the cover member from being detached. However, for example, if the gas evaporated from the electrolyte solution is released, a partially liquefied gas may flow into a space between the outer surface of the case and the inner surface of the cover member. That is, in a portion to which the ring-shaped member is attached, the liquefied gas may flow into a space between the outer surface of the case and the inner surface of the cover member. Then, the liquefied gas may act as a kind of lubricant. As a result, the release pressure of the evaporated gas may cause the inner surface of the cover member to slide on the outer surface of the case to thereby move upward the cover member and to dismount the cover member from the case.

In this point, according to the present invention, the thick wall portion serving as the second fixing unit is disposed so as to stop the movement of the cover member to thereby assist or reinforce the suppressing function of the first fixing unit against the cover member from detaching from the case.

Furthermore, according to a preferred structure of the above embodiment, a caulking portion is formed on an outer surface of the case, and the first fixing unit is attached to the case by using the caulking portion, and the thick wall portion as the second fixing unit has a thickness more than a distance between an inner diameter side of the ring shaped member as the first fixing unit and an outer surface side of the case.

In another aspect of the present invention, there is provided an electric equipment comprising an electric equipment comprising a lighting circuit including circuit components and an electrolytic capacitor of the structure and character mentioned above.

In this aspect, the electric capacitor may include a lighting circuit, a filter circuit, a rectifying/smoothing circuit, a high frequency conversion circuit, and a lamp lighting circuit.

Further, examples of the lighting circuit for a light source and a driving circuit for a motor, but are not particularly limited thereto. Examples of the circuit components include any component required to constitute the electrical circuit including a capacitor such as an electrolytic capacitor, a winding component such as a choke coil, and a switching element such as a transistor.

When the safety valve is actuated and smoke is released, the electrolytic capacitor can prevent the user from incorrectly identifying the smoke as a fire. Moreover, the first fixing unit and the second fixing unit securely attach or fasten the cover member to the case so as to prevent or suppress the release pressure of the evaporated gas from detaching the cover member from the case, thereby reliably and securely maintaining the attached state.

In addition, the cover member can be firmly fixed to the case in a simple structure.

In addition, the mounting performance of the first fixing unit can be reinforced and assisted by the location of the second fixing unit, which may have various configurations or shapes.

The nature and further characteristic features of the present invention will be made clearer from the following descriptions made with reference to the accompanying drawings.

DESCRIPTION OF THE PREFERRED EMBODIMENT

Figure 1A:
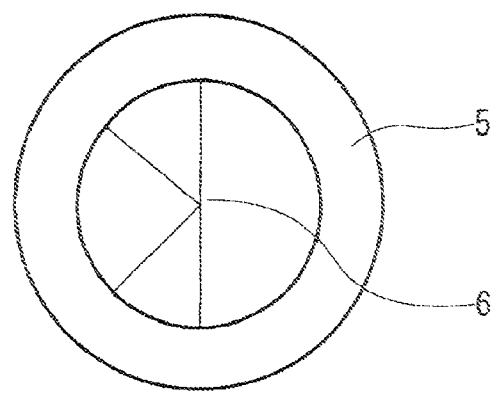
FIG. 1A is a plan view and FIG. 1B is an elevational section of an electrolytic capacitor showing a basic structure of the electrolytic capacitor.

Hereunder, preferred embodiments of an electrolytic capacitor according to the present invention will be described, and it is to be noted that terms "upper", "lower", "right", "left" and the like terms are used herein with reference to the illustration of the drawings, and in each drawing, the same reference numeral or character is assigned to the same or similar component and the duplicated description thereof is omitted.

First, basic structure or configuration of an electrolytic capacitor will be described.

Figure 1B:
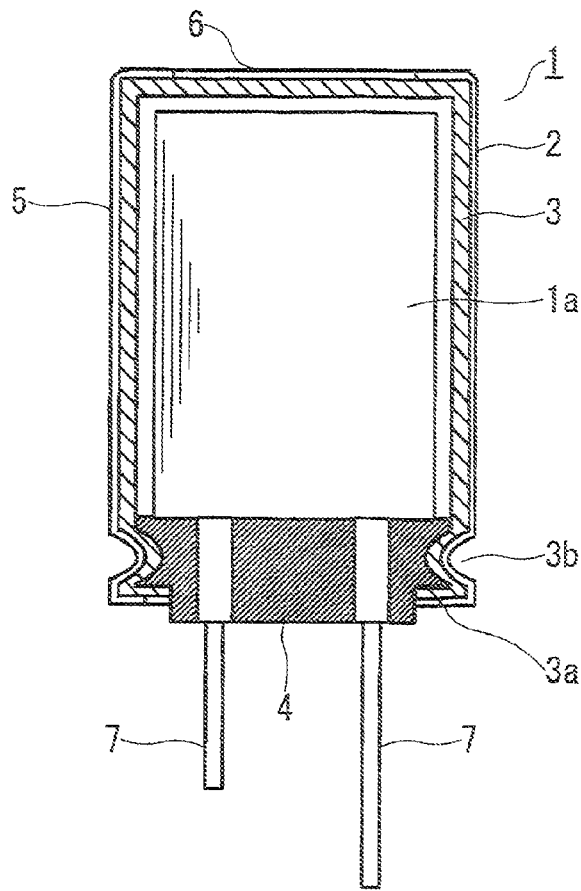

In FIGS. 1A and 1B, an electrolytic capacitor 1 includes a case 2. The case 2 includes a bottomed cylindrical aluminum case body 3 having an opening portion 3a opened downward, a sealing rubber 4 as a sealing material, and a heat-shrinkable insulating sleeve 5. The case body 3 houses an electrolytic capacitor element 1*a* which includes a pair of electrodes made of an anode foil and a cathode foil wound with an electrolytic paper sandwiched therebetween and is immersed in, for example, an ethylene glycol electrolyte solution.

A sealing rubber 4 is inserted in the opening portion 3*a* of the case body 3 (case 2), and the opening portion 3*a* is caulked against the sealing rubber 4 so as to tightly seal the case 2. The caulking portion 3*b* forms a ring-shaped recessed portion.

A safety valve 6 is provided for an end surface opposite to the opening portion 3*a* of the case body 3, and the safety valve 6 acts such that, when an internal pressure of the case body 3 exceeds a predetermined pressure, to brake a K-shaped thin wall portion of the case body 3 to as to break that portion of the case body 3 so that the gas evaporated from the electrolyte solution is released to outside. The thin wall portion may be of an X-shape or a Y-shape.

The outer peripheral surface of the case 2 is covered with a cylindrical insulating sleeve 5, which is a heat-shrinkable sleeve made of a PET resin, on which a vinyl, chloride resin with the rated voltage, the capacitance, the polarity, and the like may be printed.

The insulating sleeve 5 is placed on the case 2 and then heated so as to cover the outer peripheral surface of the case 2 by the contraction. Further, leads (lead wires) 7 are disposed so as to protrude externally from the opening portion 3*a* side of the case body 3 passing through the sealing rubber 4. One of the lead wires 7 is connected to the anode foil and the other one thereof is connected to the cathode foil.

The first embodiment of the present invention will be described hereunder.

(First Embodiment—Example 1)

Figure 2:
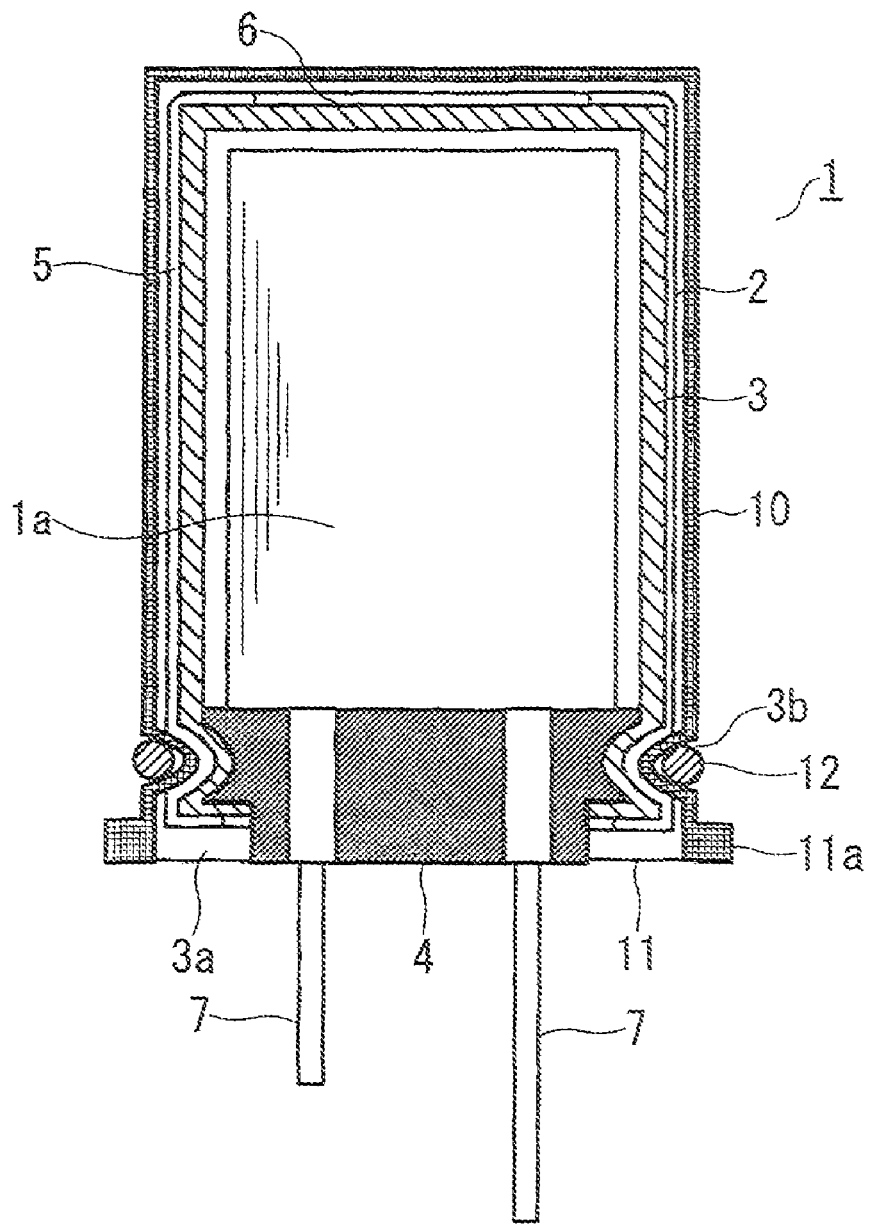
FIG. 2 is a sectional view illustrating the electrolytic capacitor according to a first embodiment (Example 1) of the present invention.

As illustrated in FIG. 2, the electrolytic capacitor 1 of this example includes a cover member 10 covering an upper surface and a side peripheral surface of the case 2, which contains the safety valve 6. The cover member 10 is formed of an elastomer made of a translucent silicone resin and a modified compound thereof or an elastomer containing a fluorinated compound and a polyetherimide compound. The cover member 10 has a cylindrical cap shape having extensible (expansion/contraction), heat resisting and elastic properties. The cover member 10 includes an opening portion 11 formed on one end portion thereof. A thick wall portion 11*a* with a quadrangular section is formed on a peripheral end edge of the opening portion 11 of the cover member 10.

The opening portion side of the cover member 10 is tightened by an elastic ring-shaped member 12 from the outer peripheral side so as to be firmly secured to the case 2. The ring-shaped member 12 is mounted by utilizing the caulking portion 3*b* of the opening portion 3*a* of the case body 3 (case 2) so as to securely fix the cover member 10 to the case 2. The ring-shaped member 12 may be made of a synthetic resin or a metal material, and may have a C-shape. Further, the ring-shaped member 12 may be formed so as to wind the opening portion 11 side of the cover member 10 from the outer peripheral side by using a band-shaped metal fitting or a wire.

As a result, the space formed between the inside of the cover member 10 and the outside of the case 2 is hermetically sealed, and thus, the case 2 is air-tightly covered with the cover member 10. Further, it is preferred to form the cover member 10 of a material excellent in contraction and expansion, heat resistance, elasticity, and corrosion resistance to the electrolyte solution.

Figure 3:
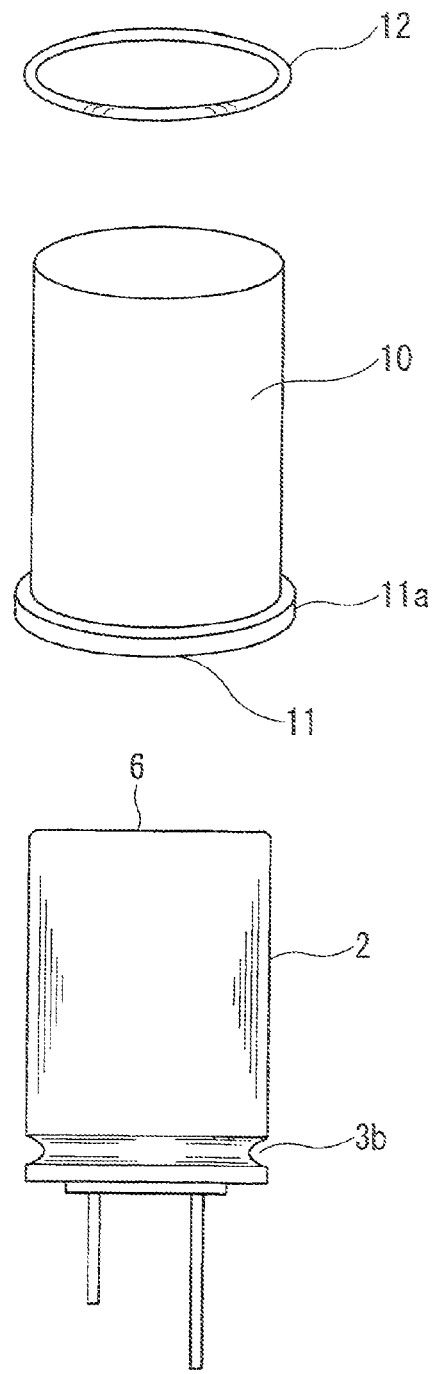
FIG. 3 is an illustration of a developed perspective view of the electrolytic capacitor.

As exemplarily illustrated in FIG. 3, the cover member 10 is applied to the case 2 from the upper surface side thereof, and that is, the upper end surface 6 is fitted into the cover member 10 through the opening portion 11 thereof till the upper surface and the side peripheral surface of the case 2 are covered with the cover member 10.

Then, the ring-shaped member 12 is fitted to the caulking portion 3*b* from the upper side of the cover member 10 by applying a force to extend the internal diameter of the ring-shaped member 12 against the elastic force thereof. When this formed is released, the ring-shaped member 12 is fitted into and engaged with a ring-shaped recessed portion of the caulking portion 3*b* by its own elastic restoration force and fastened to the case 2 so as to tighten the periphery of the cover member 10. Further, it may be possible to use the cover member 10 having an internal diameter smaller than an external diameter of the case 2. In that case, the cover member 10 is placed over the case 2 from the upper surface side thereof by expanding the opening portion 11 of the cover member 10.

Figure 4:
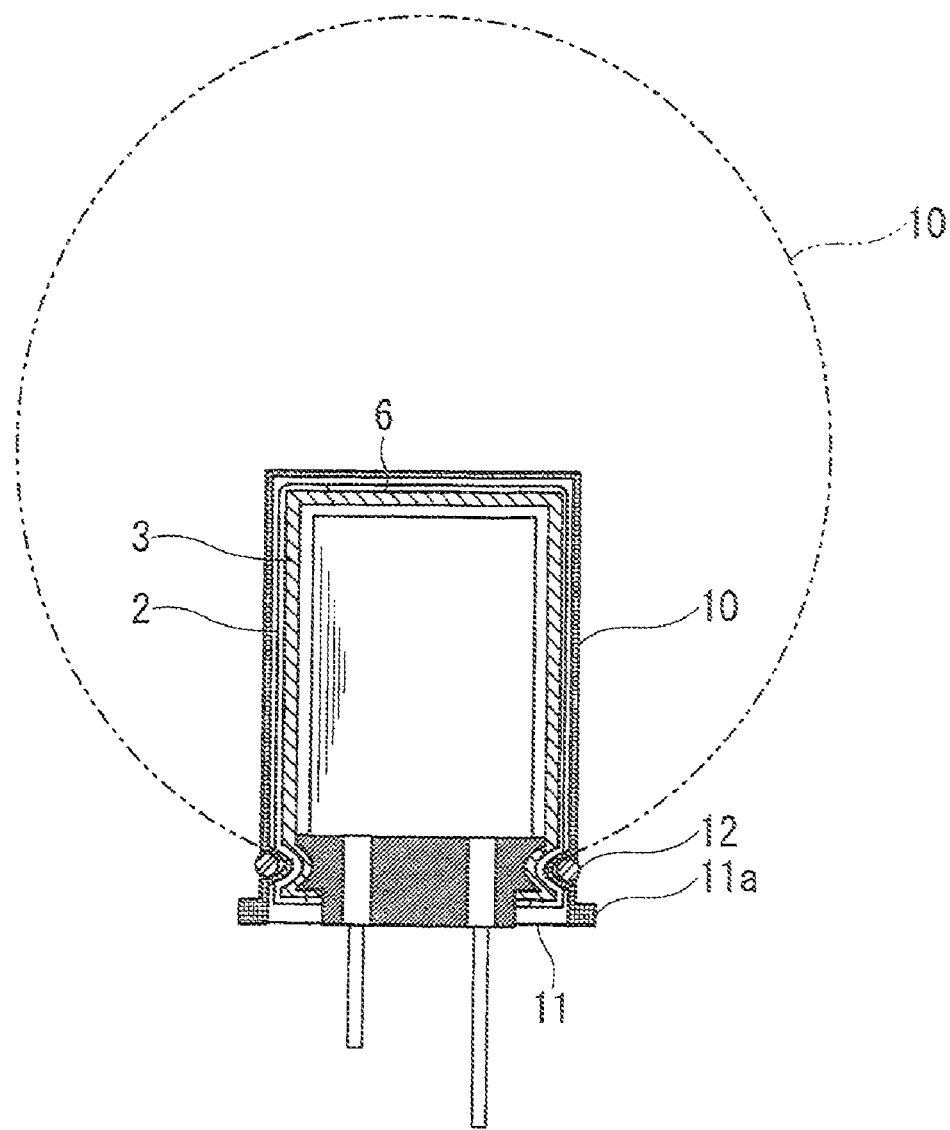
FIG. 4 is a sectional view schematically illustrating the electrolytic capacitor when a safety valve is actuated.

Next, with reference to FIG. 4, the operation and function of the electrolytic capacitor 1 of the structure mentioned above will be described.

When an excess voltage is applied to the electrolytic capacitor 1 or an abnormal event occurs at the end of life thereof, and then, a pressure inside the case body 3 exceeds a predetermined pressure due to the gas evaporated from the electrolyte solution, the safety valve 6 is actuated for the purpose of preventing the case body 3 from being burst, and the K-shaped thin wall portion is broken to thereby externally release the gas evaporated from the electrolyte solution. Furthermore, in such a case, a flammable gas or an abnormal odor may occur. The cover member 10 has extensive property and hermetically covers the case body 3. Thus, when the safety valve 6 is actuated, the cover member 10 is expanded outward in a bag shape by the release pressure of the evaporated gas. In this state, the evaporated gas remains inside the cover member 10, and thus, the evaporated gas can be prevented from being released externally of the case.

At this time, the opening portion 11 side of the cover member 10 is fixed to the case 2 by the ring-shaped member 12, which can suppress the cover member 10 from being detached therefrom due to the release pressure of the evaporated gas, thereby securely maintaining the attached state.

Basically, as described above, the cover member 10 can be suppressed from being detached. However, if the gas evaporated from the electrolyte solution is released, a partially liquefied gas may flow into a space between the outer surface of the case 2 and the inner surface of the cover member 10. That is, in the caulking portion 3*b* to which the ring-shaped member 12 is fitted, the liquefied gas may flow into the space between the outer surface of the case 2 and the inner surface of the cover member 10. Then, the liquefied gas acts as a lubricant. As a result, the release pressure of the evaporated gas causes the inner surface of the cover member 10 to slide on the outer surface of the case 2, so that the cover member 10 moves upward and is detached from the case 2.

Figure 5:
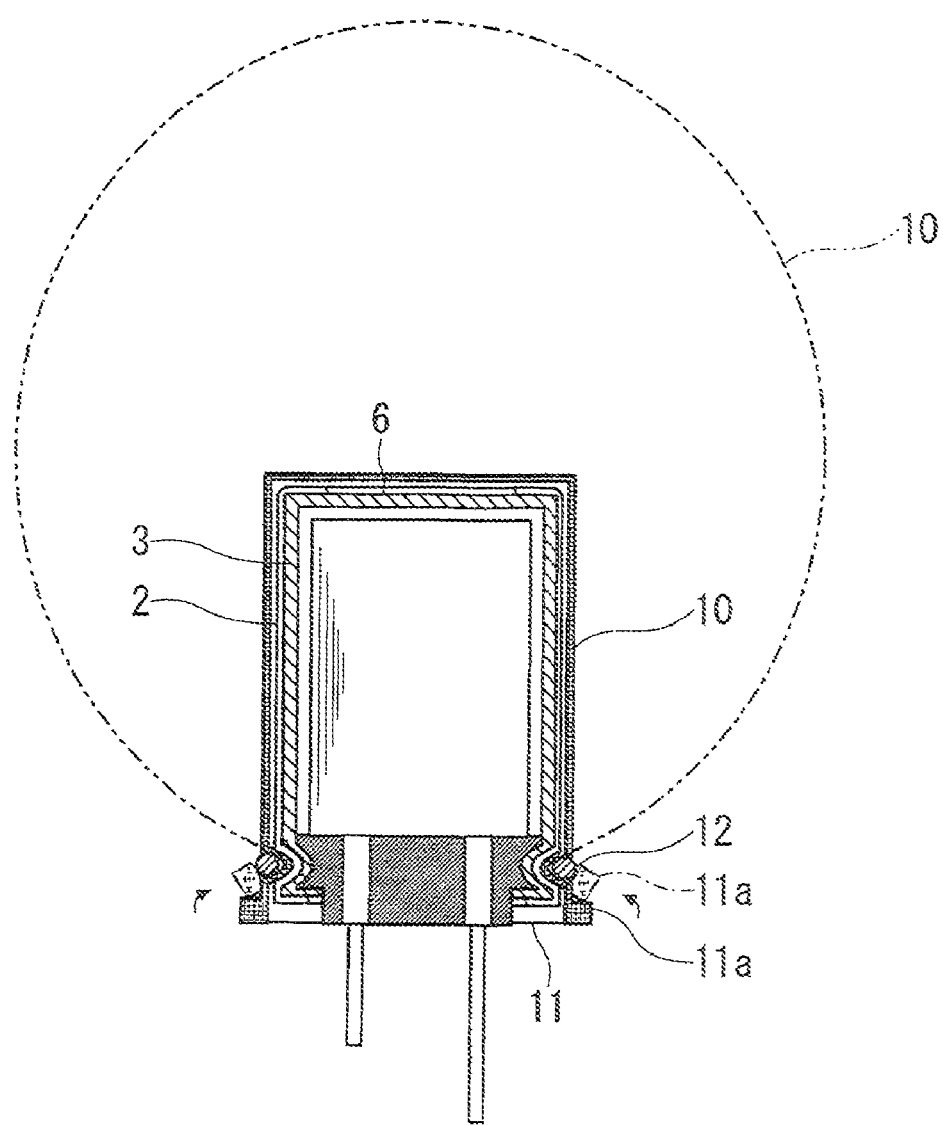
FIG. 5 is a sectional view also schematically illustrating the electrolytic capacitor when the safety valve is actuated.

However, according to the present example, as illustrated in FIG. 5, even if the inner surface of the cover member 10 slides on the outer surface of the main body case 2 and then moves the cover member 10 upward, the thick wall portion 11*a* formed to the opening portion 11 of the cover member 10 stops the upward movement of the cover member 10. That is, because of the thickness of the thick wall portion 11*a*, it cannot pass through the space between the inner surface side of the ring-shaped member 12 and the outer surface side of the case 2. Therefore, the thick wall portion 11*a* moves indicated by arrows in the figure and is caught by the ring-shaped member 12 so as to suppress the cover member 10 from being detached from the case 2, thus reliably maintaining the attached state.

In the above configuration, the ring-shaped member 12 suppresses the cover member 10 from being detached from the case 2, and the thick wall portion 11a acts to reinforce the suppressing of the ring-shaped member 12. Thus, the ring-shaped member 12 is configured as the first fixing member and the thick wall portion 11a is configured as the second fixing member.

Further, it can be assumed that when the safety valve 6 is actuated, the pressure inside the case body 3 is 8 to 10 kgf/cm², so that in consideration of the contraction or expansion of the cover member 10 and breakage thereof, it may be preferred to form the cover member 10 to have a thickness of 50 μm or more, and more preferably 0.2 mm or more. At the end of life of the electrolytic capacitor 1, it is assumed that the electrolyte solution is reduced through the evaporation thereof and the capacitance thereof is to be 60% or less of the original capacitance. Based on the above data, in order to securely trap the gas evaporated from the electrolyte solution within the cover member 10, a desired expansion or contraction rate of the cover member 10 is preferably 250% or more of the internal volume of the cover member 10, and more preferably, 500% of the internal volume thereof.

As described above, according to the present example, when the safety valve 6 is actuated and the gas evaporated from the electrolyte solution is released, the cover member 10 is expanded to keep the evaporated gas remaining inside the cover member 10, thereby preventing the evaporated gas from flowing outside. Therefore, when the safety valve 6 is actuated and gas is released, according to the Example 1 of this first embodiment, it becomes possible for a user to prevent incorrectly consideration as a fire. Moreover, the ring-shaped member 12 fixes the cover member 10 to the case 2 so as to suppress the detachment, and in addition, the thick wall portion 11a reinforces the suppressing (or preventing) function against the detachment, thus reliably maintaining the attached state of the cover member 10.

(First Embodiment—Example 1)

Figure 6:
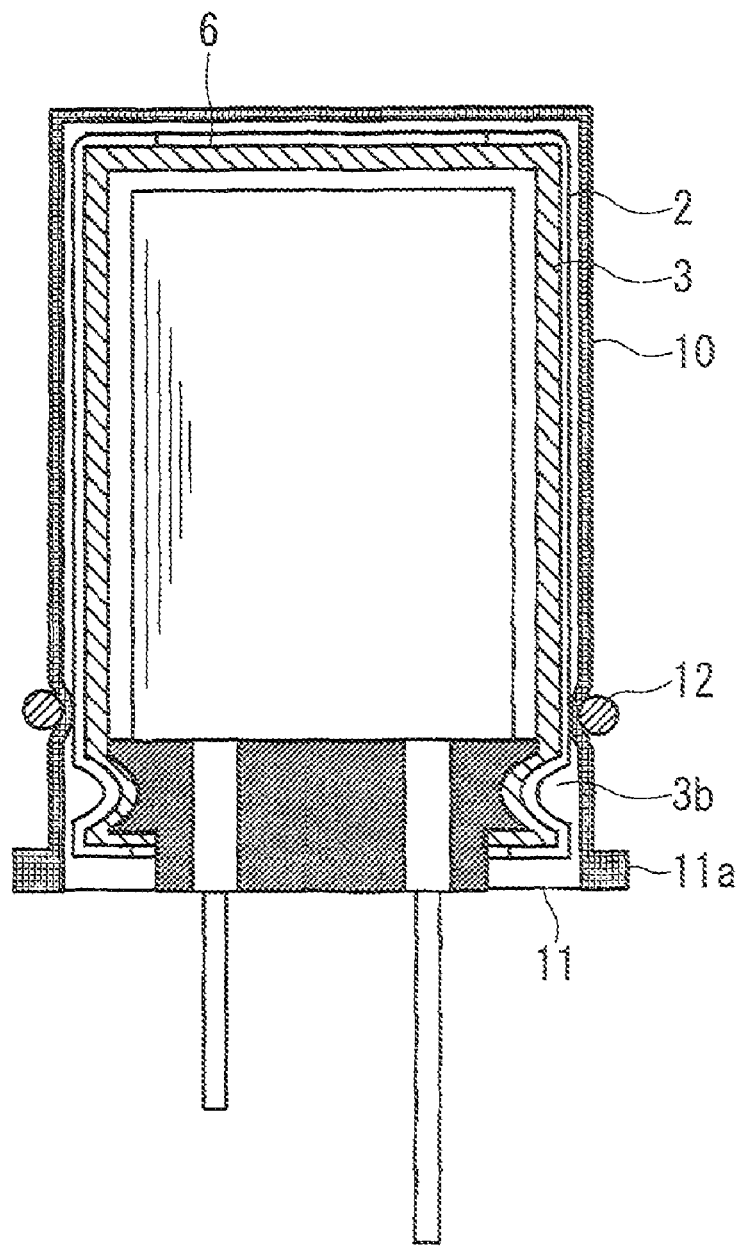
FIG. 6 is a sectional view illustrating the electrolytic capacitor according to the first embodiment (Example 2) of the present invention.

As illustrated in FIG. 6, according to the present example of the first embodiment, the ring-shaped member 12 is attached to a position slightly above the caulking portion 3b from the outer peripheral side of the cover member 10. According to the present example, when the gas evaporated from the electrolyte solution is released, even if the inner surface of the cover member 10 is slid on the outer surface of the case 2 and moves the cover member 10 upward, the thick wall portion 11a formed on the opening portion 11 of the cover member 10 also acts to stop the upward movement of the cover member 10. Therefore, this second example 2 can prevent the cover member 10 from being dismounted from the case 2 and can reliably maintain the mounted state.

Thus, the present example 20 can also attain the same effects as those attained by the former example 1.

Various examples of the cover member 10 will be described hereunder with reference to FIGS. 7A to 7I, in which the many modified examples of the thick wall portion 11a serving as the second fixing member are illustrated.

Figure 7A:
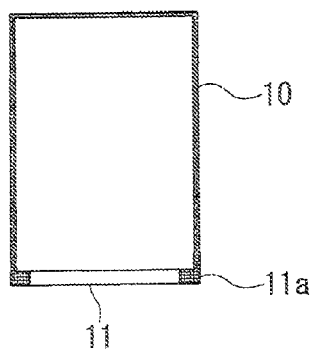
FIGS. 7A to 7I are illustrations of sectional views of examples of a cover member having a thick wall portion.

FIG. 7A illustrates a modified example of the cover member 10 in which the thick wall portion 11a with a quadrangular section is formed on a peripheral end edge of the opening portion 11 so as to project inward at the inner peripheral portion.

Figure 7B:
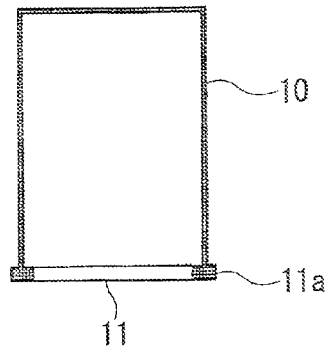

FIG. 7B illustrates a modified example of the cover member 10 in which the thick wall portion 11a with a quadrangular section is formed on a peripheral end edge of the opening portion 11 so as to project inward and outward at the outer and inner peripheral portions.

Figure 7C:
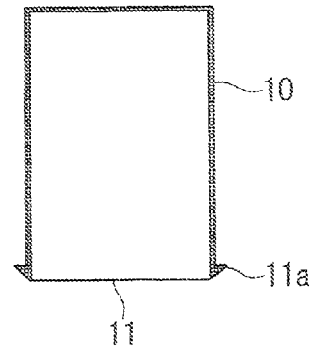
Figure 7D:
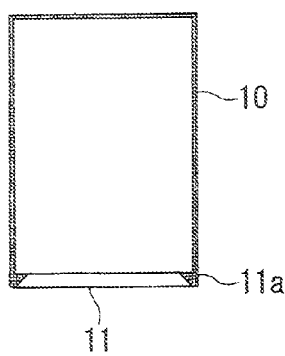

FIGS. 7C and 7D each illustrate a modified example of the cover member 10 in which the thick wall portion 11a is formed into a wedge-shape so as to project outward in FIG. 7C and to project inward in FIG. 7D at the lower end edge peripheral portion 11a.

Figure 7E:
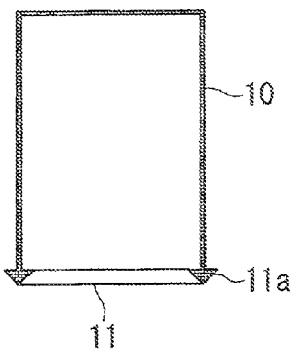
Figure 7F:
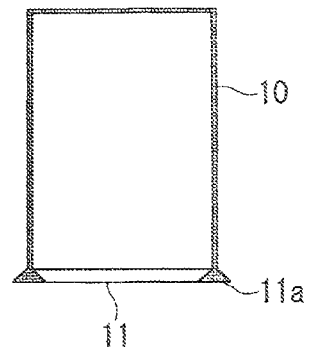

FIGS. 7E and 7F each illustrate a modified example of the cover member 10 in which the thick wall portion 11a is formed into a triangular shape so as to project inward and outward at the lower end edge peripheral portion 11a.

Figure 7G:
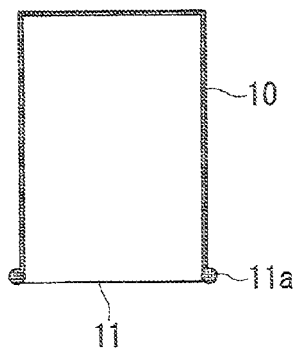
Figure 7H:
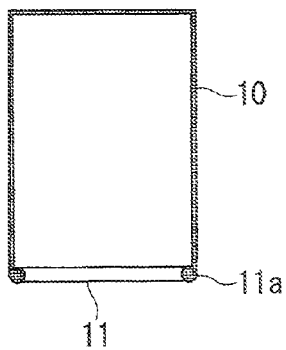
Figure 7I:
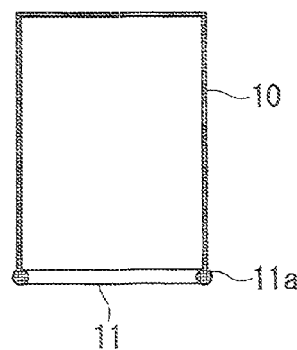

FIGS. 7G, 7H and 7I each illustrate a modified example if the cover member 10 in which the thick wall portion 11a is formed into a circular shape so as to project outward in FIG. 7G, to project inward in FIG. 7H, and to project both sides in FIG. 7I at the lower end edge peripheral portion 11a.

According to the respective examples of the configurations described above, it is possible to assist the action of suppressing the cover member 10 from being detached or dismounted from the case 2. When the thick wall portion 11a is formed so as to project in the inner peripheral direction thereof, the projected portion of the thick wall portion 11a can be temporarily fitted or attached to the lower surface side of the case 2 before the cover member 10 is attached or fitted to the case 2. Therefore, it would be expected to effectively perform the easy-to-attach effects.

(Second Embodiment)

Figure 8:
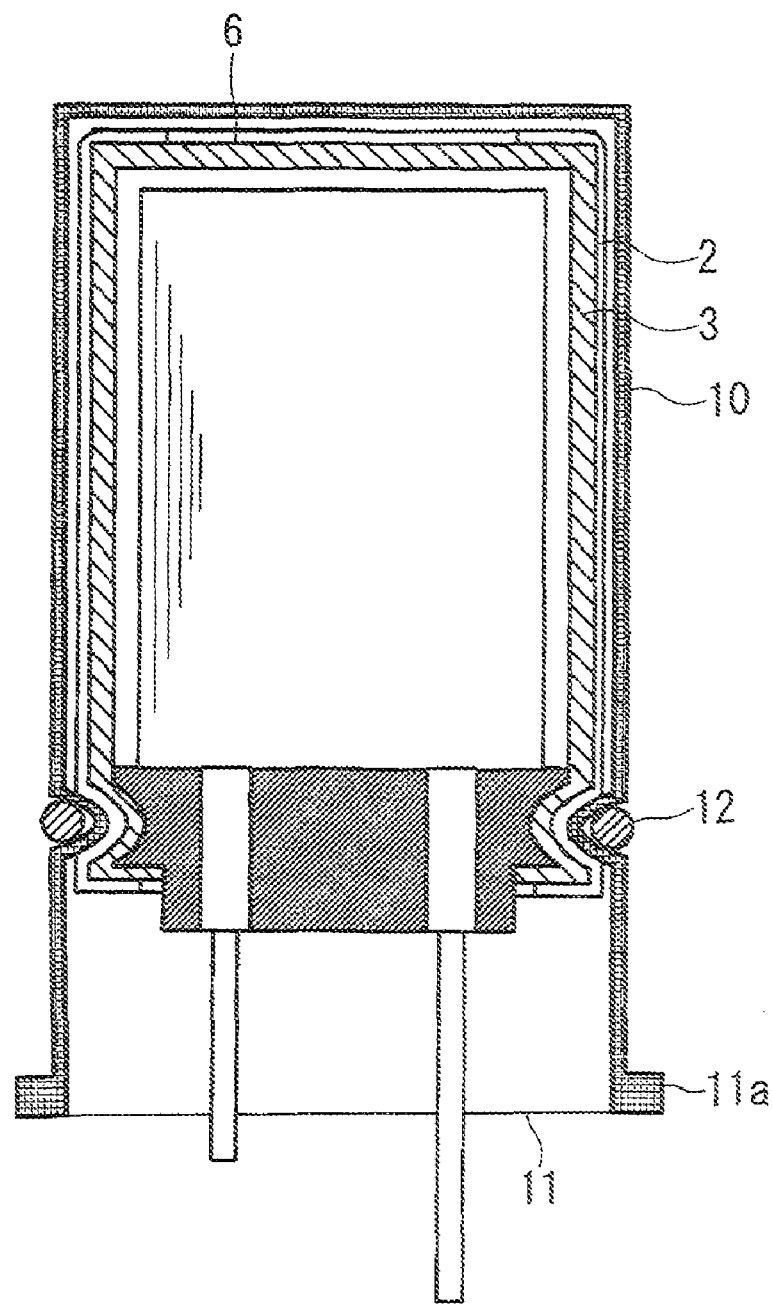
FIG. 8 is a sectional view illustrating an electrolytic capacitor according to a second embodiment of the present invention.

Hereinafter, the electrolytic capacitor according to a second embodiment of the present invention will be described with reference to FIGS. 8 and 9, in which like reference numerals or characters are added to components or members corresponding to those in the first embodiment and the duplicated description thereof is omitted.

The second embodiment aims to increase the height of the cover member 10 in comparison with that of the example 1 of the first embodiment. More specifically, the Cover member 10 is attached or mounted to the case 2 in such a manner that the thick wall portion 11a side of the cover member 10 extends downward from the bottom surface of the case 2.

Figure 9:
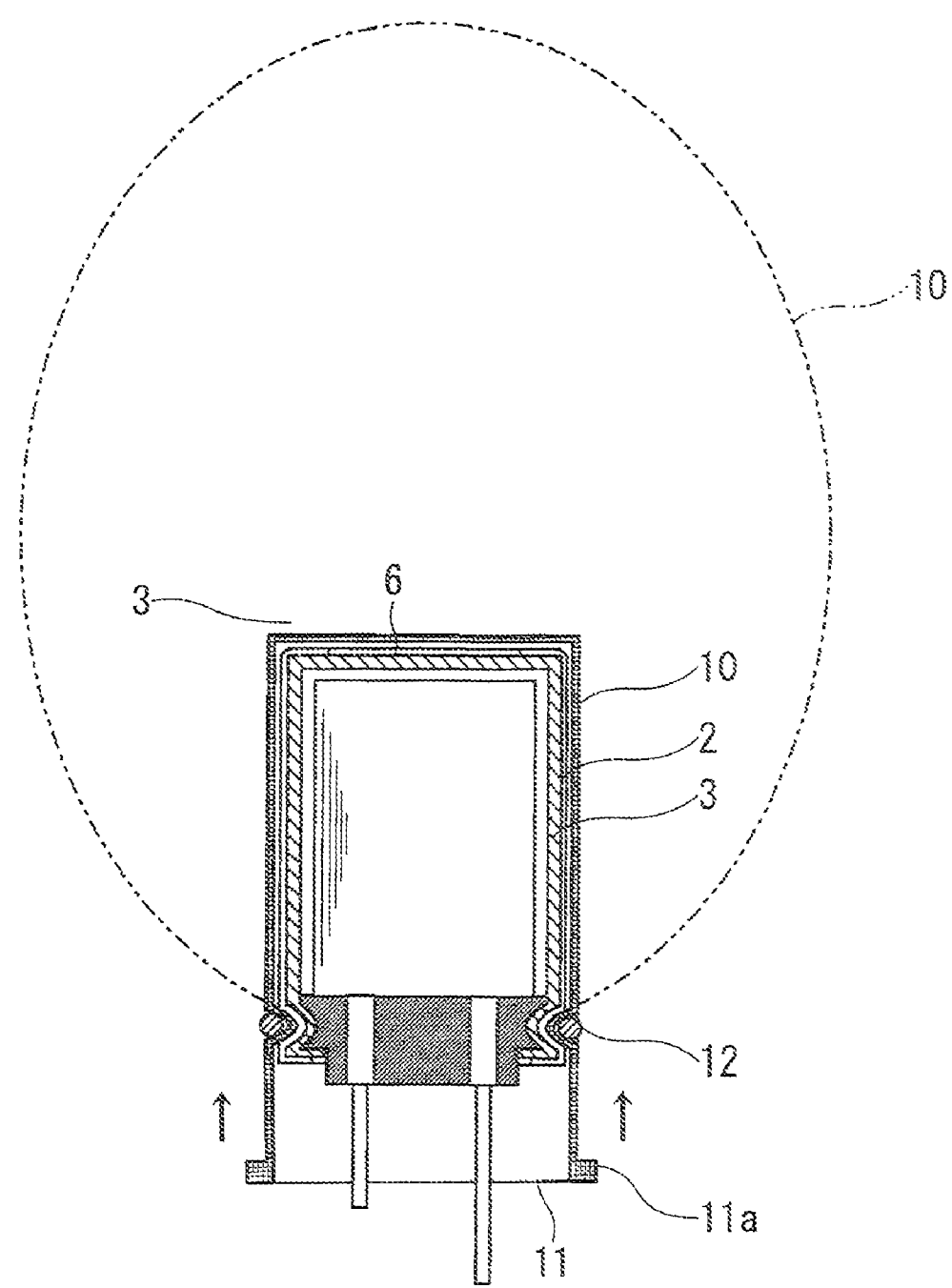
FIG. 9 is a sectional view schematically illustrating the electrolytic capacitor, according to the second embodiment, when a safety valve is actuated.

According to this configuration, when the release pressure of the evaporated gas causes the inner surface of the cover member 10 to slide on the outer surface of the case 2 to move upward the cover member 10 as illustrated by the arrows in FIG. 9, the thick wall portion 11a stops the movement of the cover member 10 and the cover member 10 expands by an amount corresponding to the movement thereof, thereby increasing the trapping volume of the gas evaporated from the electrolyte solution.

As mentioned above, according to this embodiment, substantially the same effects can be attained as those in the first embodiment by increasing the trapping volume of the gas evaporated from the electrolyte solution.

(Third Embodiment)

Hereinafter, the electrolytic capacitor according to a third embodiment of the present invention will be described with reference to FIGS. 10 to 12, in which like reference numerals are added to components or members corresponding to those of the first embodiment and the duplicated description thereof is omitted herein.

(Third Embodiment—Example 1)

Figure 10A:
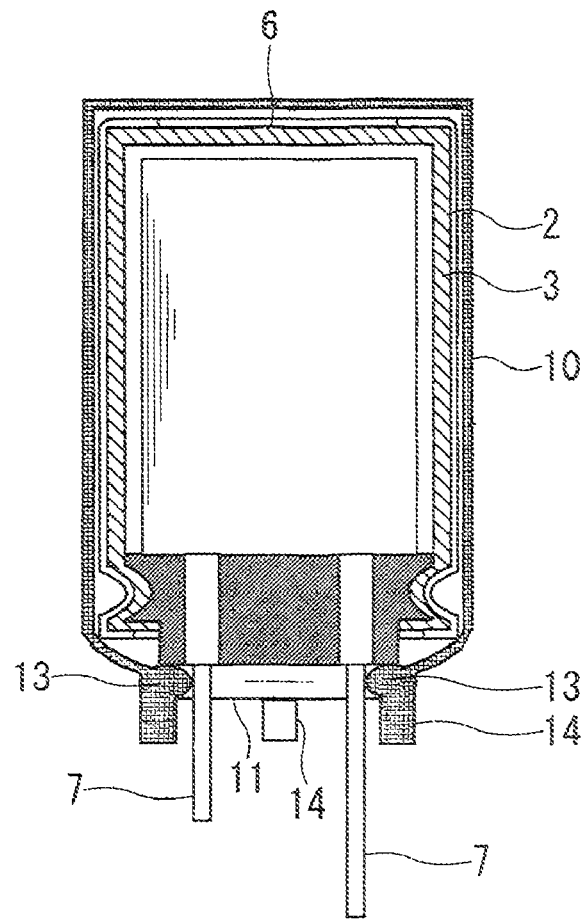
FIG. 10A is a sectional view of an electrolytic capacitor according to a third embodiment (Example 1) of the present invention.
Figure 10B:
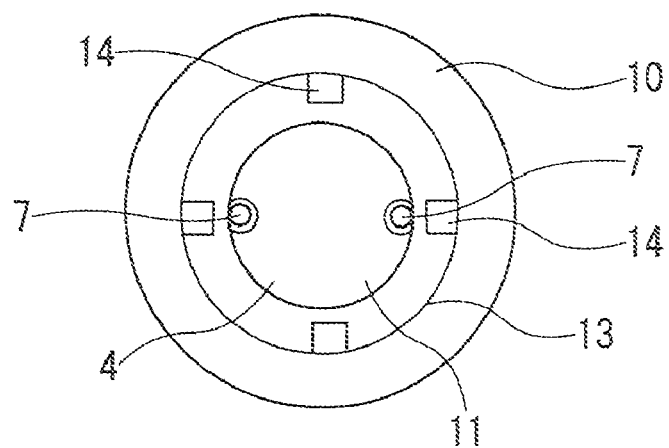
FIG. 10B is a bottom view thereof.

As illustrated in FIG. 10, the opening portion 11 of the cover member 10 has a reduced diameter in comparison with the former embodiments, and the peripheral edge thereof is formed as a thick wall clamp portion 13 in form of, ring. Four fixed leg portions 14 are formed so as to be spaced at approximately equal distance so as to project downward from the lower surface side of the clamp portion 13. When the cover member 10 is attached, the cover member 10 is placed over the case 2 by expanding the opening portion 11 of the cover member 10. In the covered state, the inner peripheral side of the clamp portion 13 takes a position in contact with the leads 7 disposed inside the opening portion 11.

It should be noted that the number of fixed leg portions 14 is not limited to four and may be changed appropriately.

Figure 11:
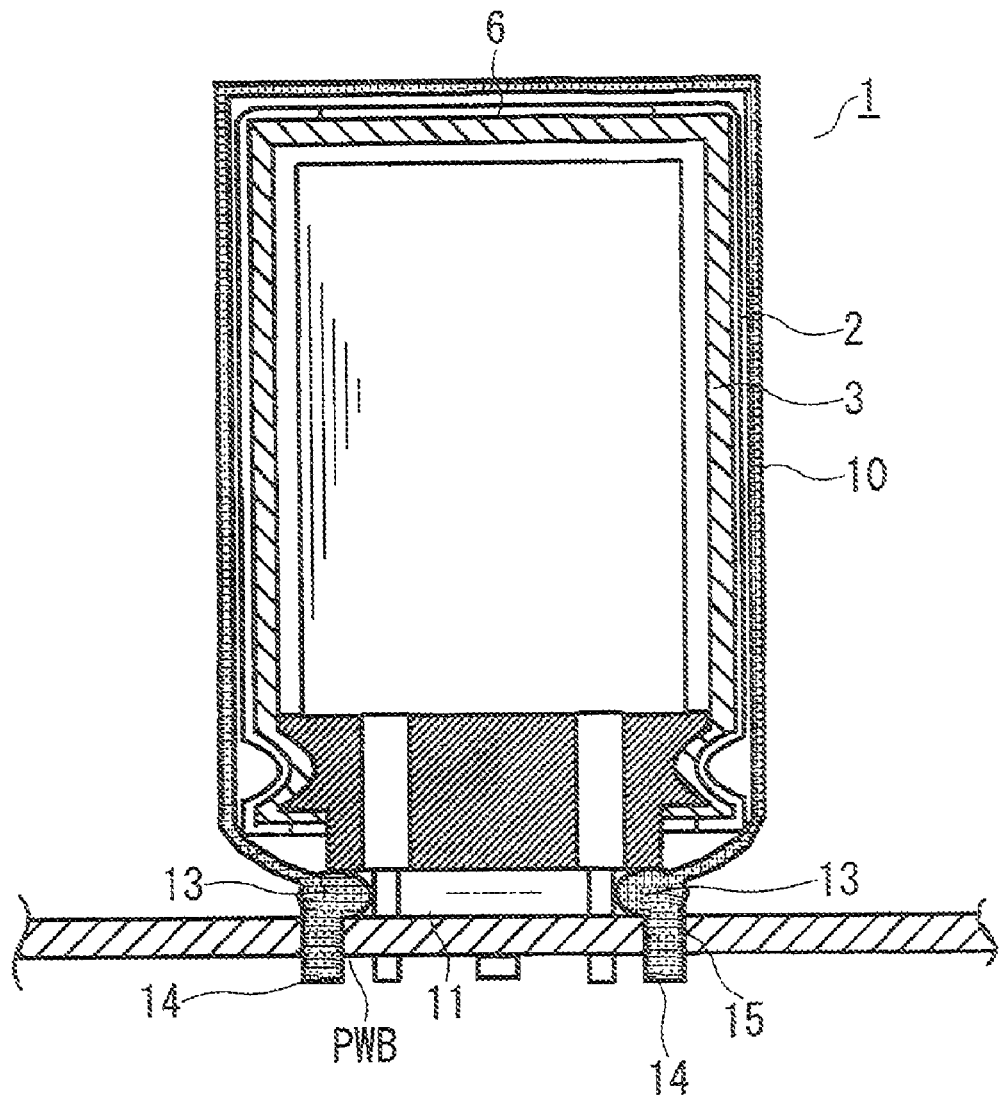
FIG. 11 is a sectional view illustrating the electrolytic capacitor attached to a substrate.

Then, as illustrated in FIG. 11, the electrolytic capacitor 1 to which the cover member 10 is attached is mounted on a printed substrate, i.e., printed-wiring board (PWB), which is preliminarily formed with insertion holes 15 corresponding to the location of the fixed leg portions 14. The fixed leg portions 14 are inserted or pressed into the insertion holes 15, respectively. The clamp portion 13 disposed on the peripheral edge of the opening portion 11 is fixed in a state of being sandwiched between the sealing rubber 4 and the surface of the printed-wiring board (PWB). The clamp portion 13 has elasticity, thus being excellent in adhesion to and between the sealing rubber 4 and the printed-wiring board (PWB). The space formed between the inside of the cover member 10 and the outside of the case 2 is maintained in a hermetically sealed state. Thus, the sealing rubber 4 and the printed-wiring board (PWB) constitute a fixing unit for fixing the cover member 10. Further, the clamp portion 13 may be configured so as to be sandwiched between the bottom surface of the case 2 and the surface of the printed-wiring board (PWB), and in this meaning, the clamp portion 13 may be called sandwiched portion 13.

According to the structures or configurations mentioned above, even if the adhesion force of the clamp (sandwiched) portion 13 sandwiched between the sealing rubber 4 and the surface of the printed-wiring board (PWB) is weakened, and the cover member 10 becomes ready to be detachable from the case 2, the fixed leg portions 14 inserted or pressed into the insertion holes 15 of the printed-wiring board (PWB) can suppress the force to act in a direction where the cover member 10 is detached or removed. Thus, the sealing rubber 4 and the printed-wiring board (PWB) are configured as the first fixing unit for fixing the cover member 10. The fixed leg portion 14 is configured as the second fixing unit for reinforcing the fixing performance of the first fixing unit.

Accordingly, as mentioned above, the present example 1 of this third embodiment can attain substantially the same effects as those attained by the first embodiment In addition, the cover member 10 sandwiched between the sealing rubber 4 and the surface of the printed-wiring board (PWB) can constitute the first fixing unit without requiring any other specific members or like.

(Third Embodiment—Example 2)

Figure 12:
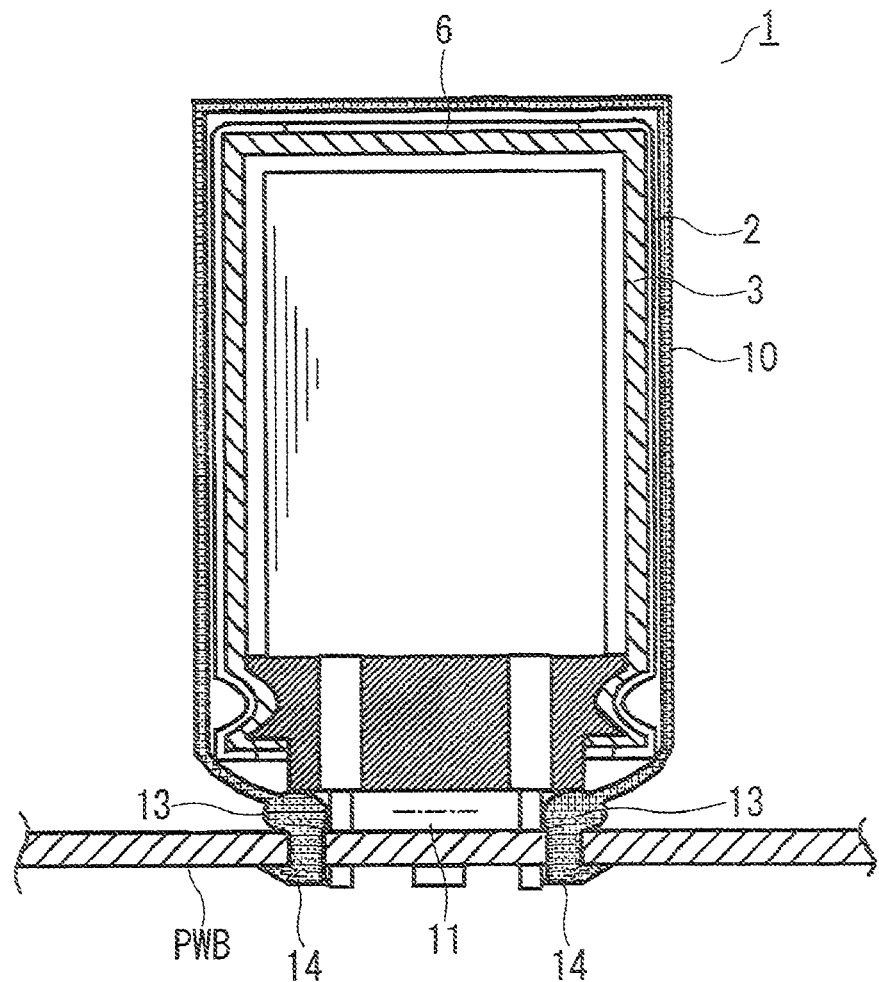
FIG. 12 is a sectional view illustrating an electrolytic capacitor according to the third embodiment (Example 2) of the present invention attached to a substrate.

As illustrated in FIG. 12, according to the present example 2 (modified example) of the third embodiment, the front (lower or tip) end side of each fixed leg portion 14 serving as the second fixing unit is formed so as to provide a wedge-shape to be engaged with the edge portion of each insertion hole 15 of the printed-wiring board (PWB). Therefore, the present example can increase the reinforcement of the fixed leg portion 14.

(Fourth Embodiment)

Hereinafter, the electrolytic capacitor according to a fourth embodiment of the present invention will be described with reference to FIGS. 13 to 14, in which like reference numerals are added to components or members corresponding to those of the first embodiment and the duplicated description thereof is omitted herein.

(Fourth Embodiment—Example 1)

Figure 13:
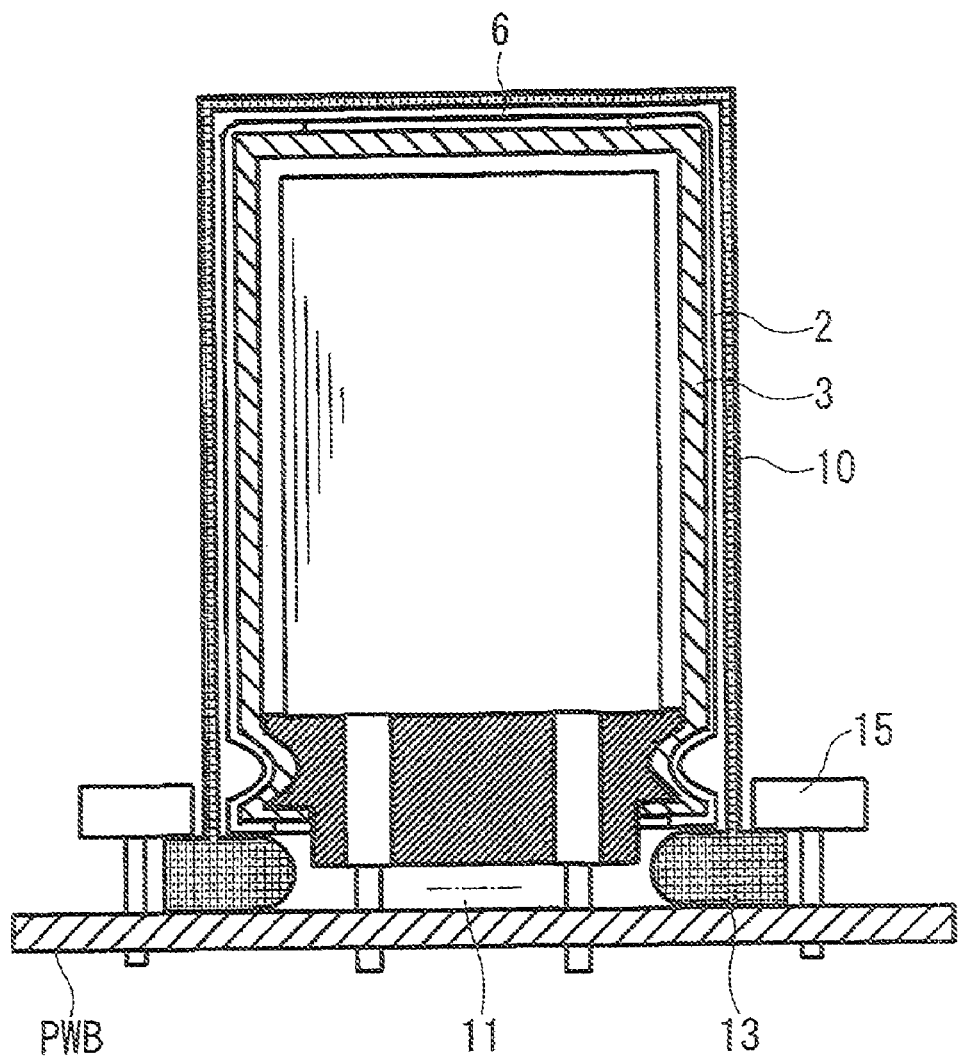
FIG. 13 is a sectional view illustrating an electrolytic capacitor according to a fourth embodiment (Example 1) of the present invention.

As illustrated in FIG. 13, the peripheral edge of the opening portion 11 of the cover member 10 is formed as a thick wall clamp (sandwiched) portion 13 in form of ring. The clamp portion 13 projects inward and outward at the inner peripheral side and the outer peripheral side thereof. The projected portion on the inner peripheral side is configured so as to be sandwiched between the bottom surface of the case 2 and the surface of the printed-wiring board (PWB). The projected portion on the outer peripheral side is disposed to be in contact with the lower surface of an electronic component 15 mounted near the electrolytic capacitor 1.

According to the above structure or configuration, even if the adhesion force of the clamp portion 13 sandwiched between the bottom surface of the case 2 and the surface of the printed-wiring board (PWB) is weakened, and the cover member 10 becomes detachable from the case 2, the electronic component 15 can suppress the force to act in a direction where the cover member 10 is detached or removed, thereby reliably maintaining the attached state of the cover member 10.

In this example, the case 2 and the printed-wiring board (PWB) are constructed as the first fixing unit for fixing the cover member 10. The electronic component 15 is constructed as the second fixing unit for reinforcing the fixing power of the first fixing unit. Further, it is to be noted that the first fixing unit and the second fixing unit need not be in a master/slave relationship, but may be in a complementary relationship. Furthermore, instead of the electronic component 15, an additional fixing member may be used as the second fixing unit.

Accordingly, the present example 1 of this fourth embodiment can attain substantially the same effects as those attained by the first embodiment.

(Fourth Embodiment—Example 2)

Figure 14:
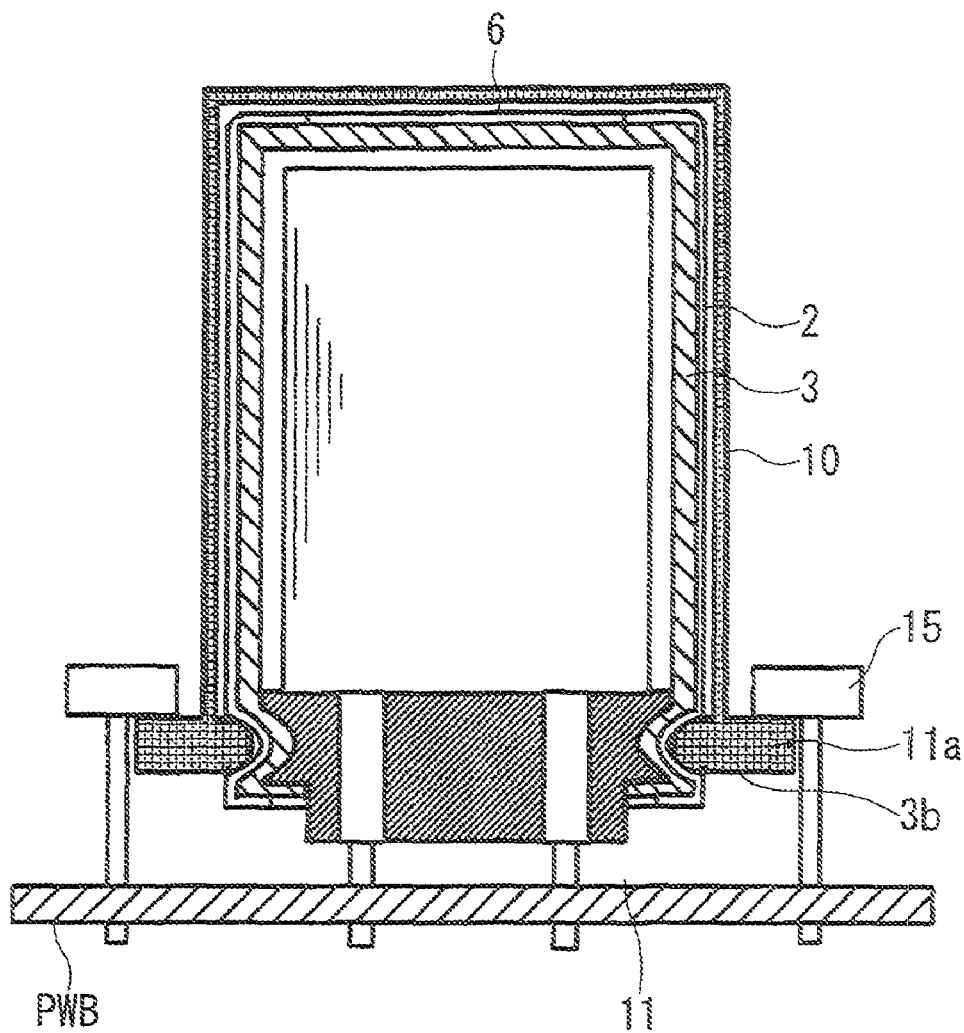
FIG. 14 is a sectional view illustrating the electrolytic capacitor according to the fourth embodiment (Example 2) of the present invention.

As illustrated in FIG. 14, a ring-shaped thick wall portion 11a is formed on a peripheral end edge of the opening portion 11 of the cover member 10. The thick wall portion 11a projects in a direction toward the inner peripheral side and the outer peripheral side thereof. The projected portion on the inner peripheral side is fitted into a ring-shaped recessed portion of the caulking portion 3b. The projected portion on the outer peripheral side is disposed so as to be in contact with the lower surface of the electronic component 15.

According to the above configuration, when the gas evaporated from the electrolyte solution is released, even if the inner surface of the cover member 10 slides on the outer surface of the case 2 and the cover member 10 moves upward, the thick wall portion 11a formed on the opening portion 11 of the cover member 10 and the electronic component 15 act to stop the movement of the cover member 10. Therefore, the present example can suppress the cover member 10 from being detached from the case 2 and can reliably maintain the attached state.

Thus, the present example can attain the substantially the same effects as those attained by the first embodiment.

(Fifth Embodiment)

Hereinafter, the electrolytic capacitor according to a fifth embodiment of the present invention will be described with reference to FIGS. 15 to 16, in which like reference numerals are added to components or members corresponding to those of the first embodiment and the duplicated description thereof is omitted herein.

Figure 15:
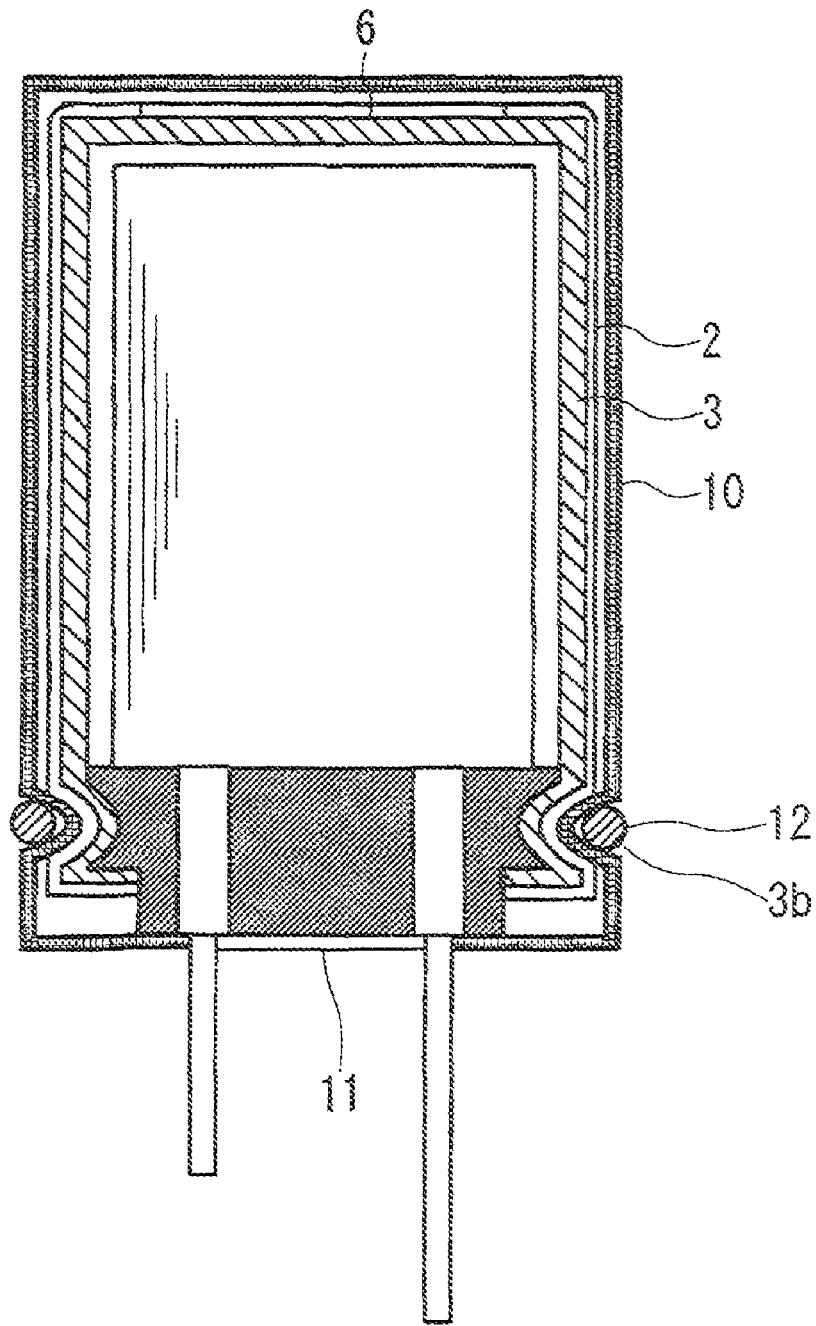
FIG. 15 is a sectional view illustrating the electrolytic capacitor according to a fifth embodiment of the present invention.

As illustrated in FIG. 15, the bottom surface of the cover member 10 has an opening portion 11 with a reduced diameter. Accordingly, the cover member 10 is attached so as to cover a predetermined range of the upper surface, the side peripheral surface and the bottom surface of the case 2 so as to include therein the safety valve 6.

Figure 16:
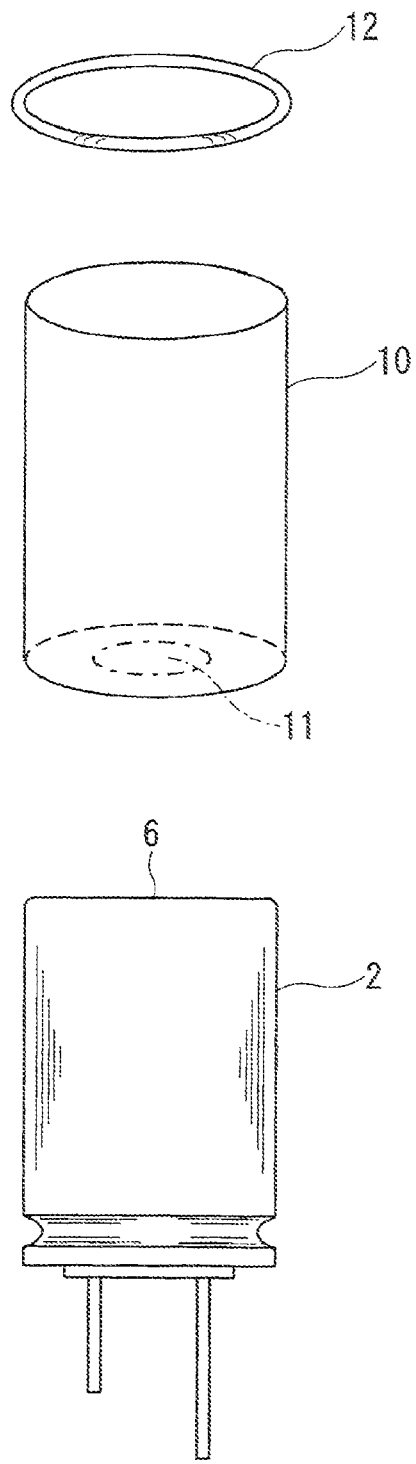
FIG. 16 is a developed perspective view of the electrolytic capacitor of the fifth embodiment.

As exemplarily illustrated in FIG. 16, the cover member 10 is attached to the case 2 by expanding the opening portion 11 of the cap-shaped cover member 10 from the upper surface side to the cover member 10 so as to be placed over the case 2. Then, the ring-shaped member 12 is fixed to the case 3 so as to tighten the periphery of the cover member 10 from the upper side.

According to this configuration, when the gas evaporated from the electrolyte solution is released, even if the inner surface of the cover member 10 slides on the outer surface of the case 2 and the cover member 10 attempts to move upward, the reduced diametered opening portion 11 of the cover member 10 prevent the upward movement of the cover member 10. Moreover, the ring-shaped member 12 serving as the first fixing unit also serves to fix the cover member 10 to the case 2 to effectively prevent the cover member 10 from being removed. Further, the reduced diametered opening portion 11 serving as the second fixing unit reinforces this detaching-suppression force, and thus can reliably maintain the attached state of the cover member 10.

Accordingly, the present example can attain substantially the same effects as those attained by the first embodiment.

(Sixth Embodiment)

Hereinafter, the electrolytic capacitor according to a fifth embodiment of the present invention will be described with reference to FIGS. 17 to 22, in which like reference numerals are added to components or members corresponding to those of the first embodiment and the duplicated description thereof is omitted herein.

(Sixth Embodiment—Example 1)

Figure 17:
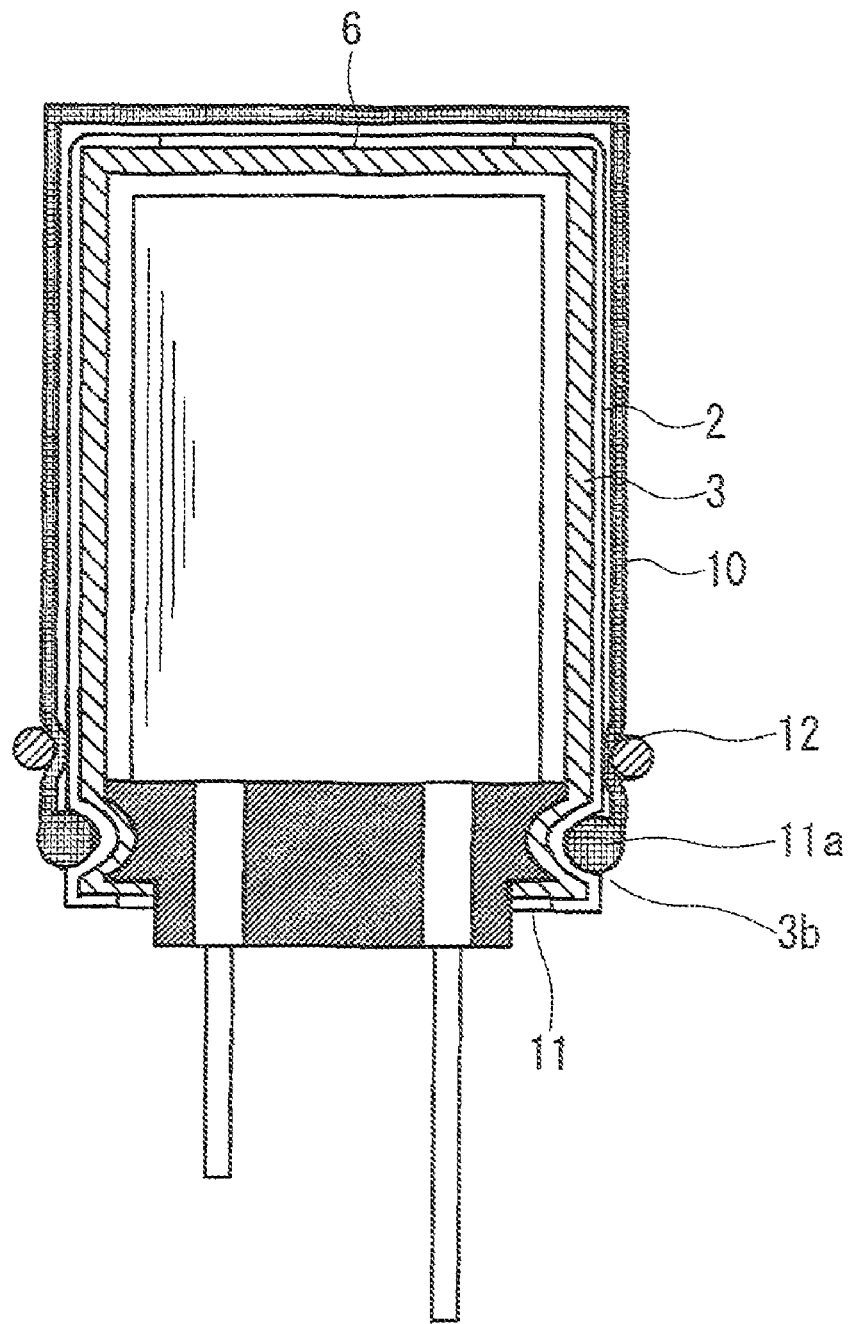
FIG. 17 is a sectional view illustrating an electrolytic capacitor according to a sixth embodiment (Example 1) of the present invention.
Figure 18:
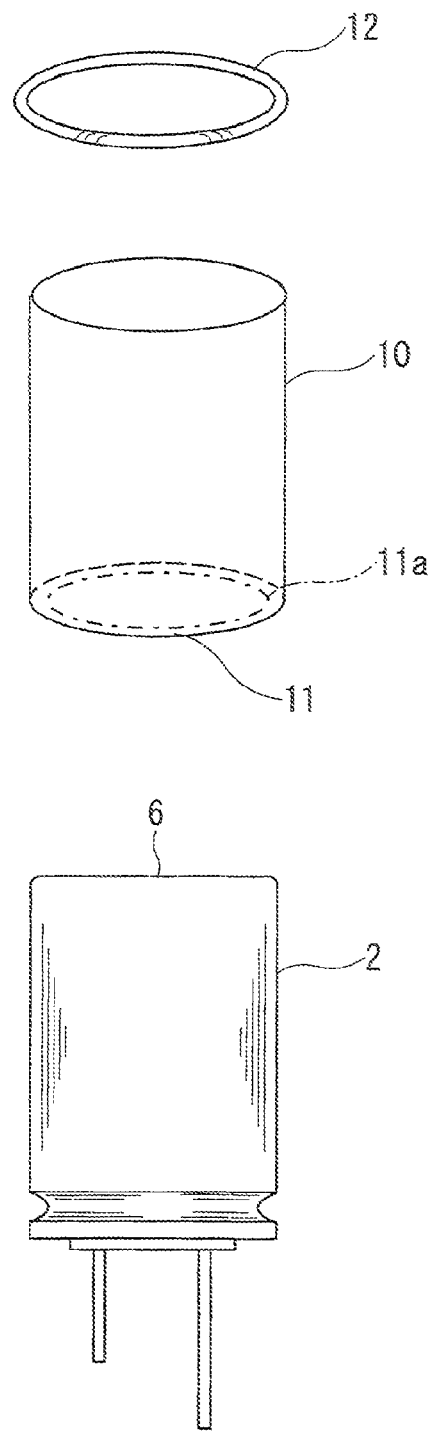
FIG. 18 is a developed perspective view of the electrolytic capacitor of the sixth embodiment of FIG. 17.

As illustrated in FIGS. 17 and 18, a thick wall portion 11a having a circular section is formed on the peripheral end edge of the opening portion 11 of the cover member 10. The thick wall portion 11a is disposed so as to be fitted into the ring-shaped recessed portion of the caulking portion 3b. The ring-shaped member 12 is mounted to a position slightly above the caulking portion 3b from the outer peripheral side of the cover member 10.

The cover member 10 is attached by expanding the opening portion 11 of the cover member 10 to be placed over the case 2 so as to fit the thick wall portion 11a into the ring-shaped recessed portion of the caulking portion 3b. Then, the ring-shaped member 12 is applied to the case so as to be fixed to the case 2 to tighten the periphery of the cover member 10 thereto from the upper side. Therefore, the thick wall portion 11a can be temporarily fitted into the caulking portion 3b, thereby attaining the easy-to-attaching effect on the cover member 10.

(Sixth Embodiment—Example 2)

Figure 19:
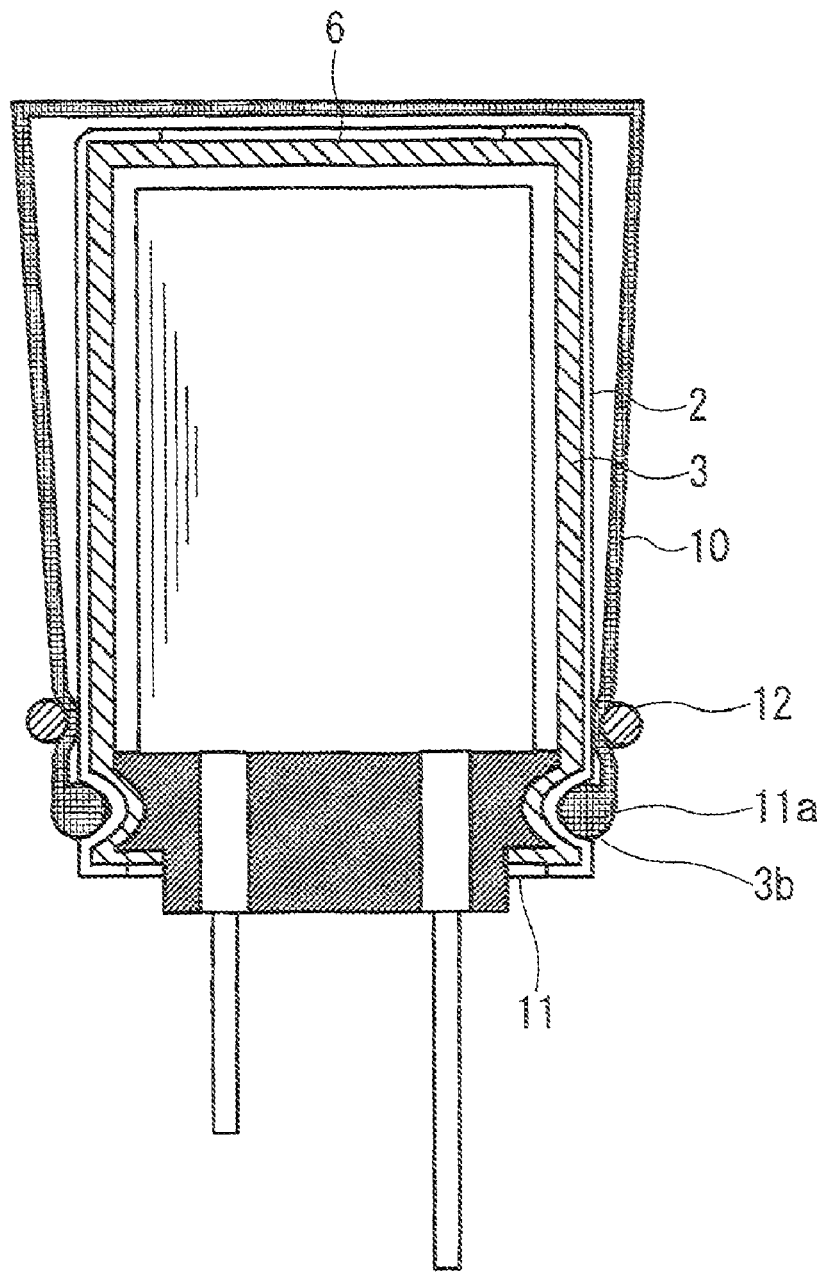
FIG. 19 is a sectional view illustrating the electrolytic capacitor according to the sixth embodiment (Example 2) of the present invention.
Figure 20:
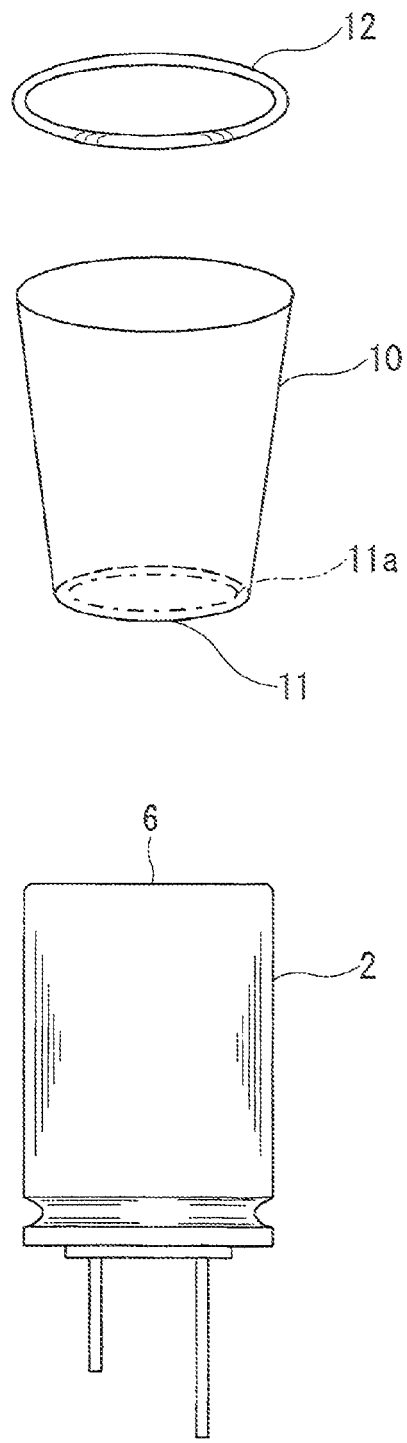
FIG. 20 is a developed perspective view of the electrolytic capacitor of the sixth embodiment of FIG. 19.

As illustrated in FIGS. 19 and 20, unlike the above example 1, the cover member 10 is formed into a reversed frustoconical shape. As illustrated in FIG. 20, a reduced diametered opening portion 11 is formed on the bottom surface side of the cover member 10. The cover member 10 is attached by expanding the reduced diametered opening portion 11 of the cover member 10 to be placed over the case 2. Thus, the present example 2 can firmly attach the thick wall portion 11a to the caulking portion 3b by the elastic restoration force by the reduced diameter of the opening portion 11a.

(Sixth Embodiment—Example 3)

Figure 21:
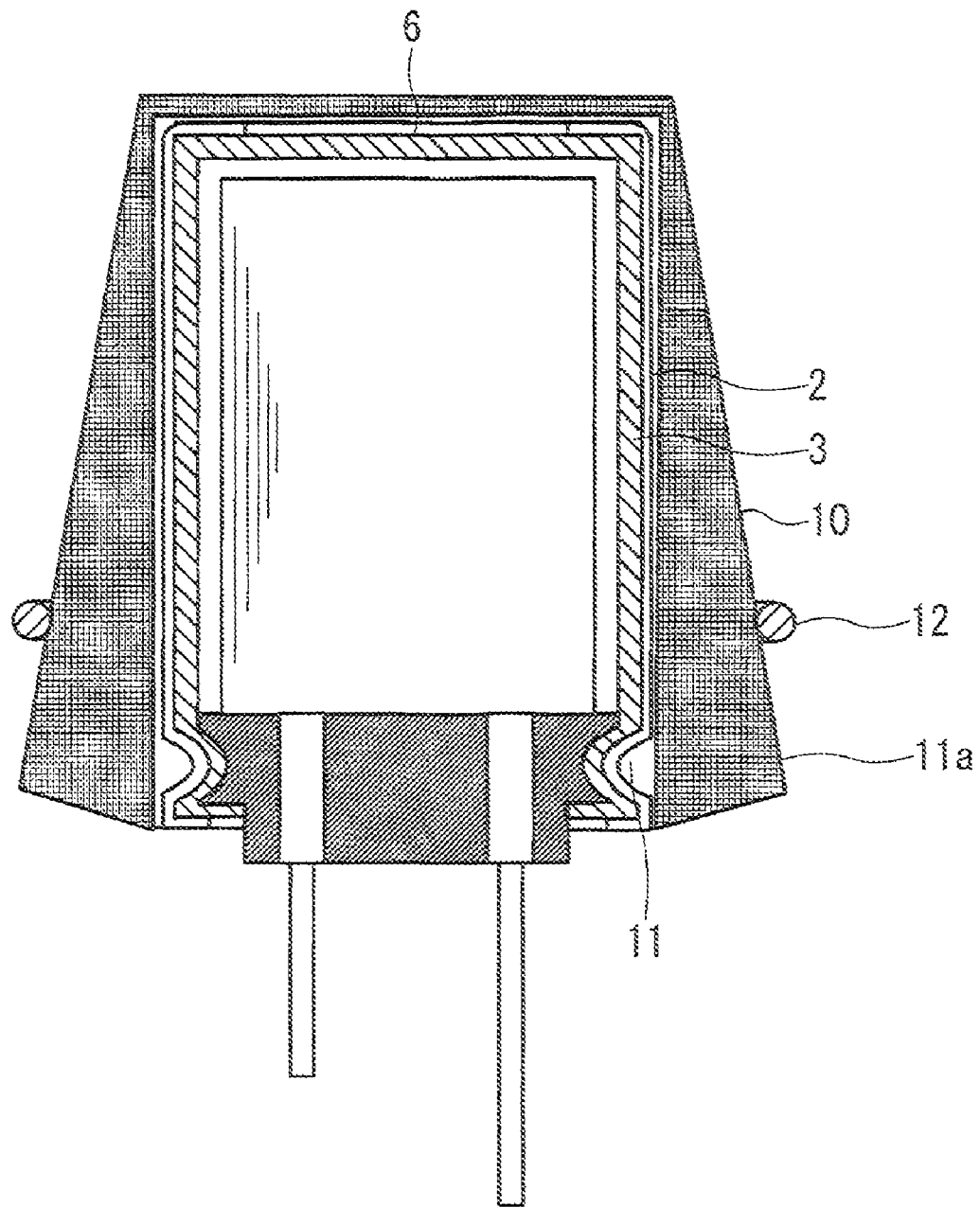
FIG. 21 is a sectional view illustrating an electrolytic capacitor according to the sixth embodiment (Example 3) of the present invention.
Figure 22:
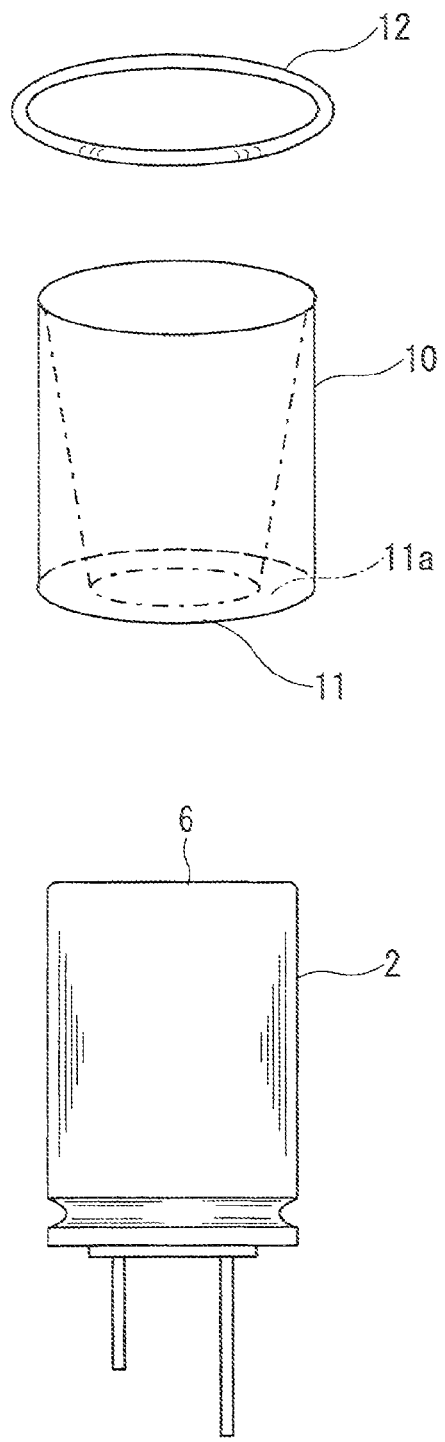
FIG. 22 is a developed perspective view of the electrolytic capacitor of the sixth embodiment of FIG. 21.

As illustrated in FIGS. 21 and 22, the entire shape of the cover member 10 is cylindrical shape (reversed frustoconical shape) including inner hollow portion. More specifically, the cover member 10 is formed so as to be gradually thicker from the upper side toward the lower side of the opening portion 11. When the cover member 10 is attached, like the above Example 2, the cover member 10 is placed over the case 2 by expanding the reduced diametered thick opening portion 11 of the cover member 10. The thick wall portion 11a can be firmly attached to the outer periphery of the case 2 by the elastic restoration force due to the reduced diameter thereof.

Then, the ring-shaped member 12 is fixed to the case 2 so as to tighten the periphery of the cover member 10 thereto from the upper surface side.

According to the structure or configuration of each of the examples described above, even if the inner surface of the cover member 10 attempts to slide on the outer surface of the case 2 to move the cover member 10 upward, the thick wall portion 11a formed on the opening portion 11 side of the cover member 10 effectively stops the upward movement of the cover member 10.

Thus, the present example can also attain exert substantially the same effects as those attained by the first embodiment.

(Further Embodiment)

Hereinafter, with reference to FIGS. 23 and 24, an embodiment of the electric equipment of the present invention, which is equipped with a rectifying/smoothing circuit, which may include the electrolytic capacitor according to each embodiment of the present invention mentioned above, will be described.

Figure 23:
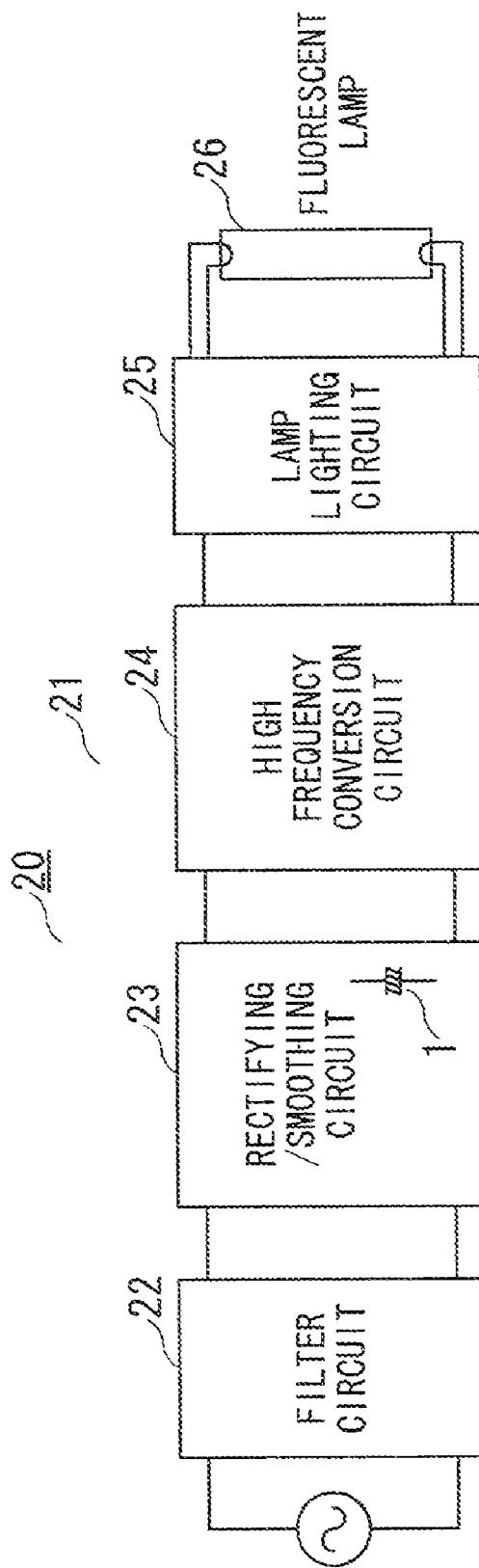
FIG. 23 is block diagram illustrating a lighting apparatus as an embodiment of the electric equipment of the present invention.
Figure 24:
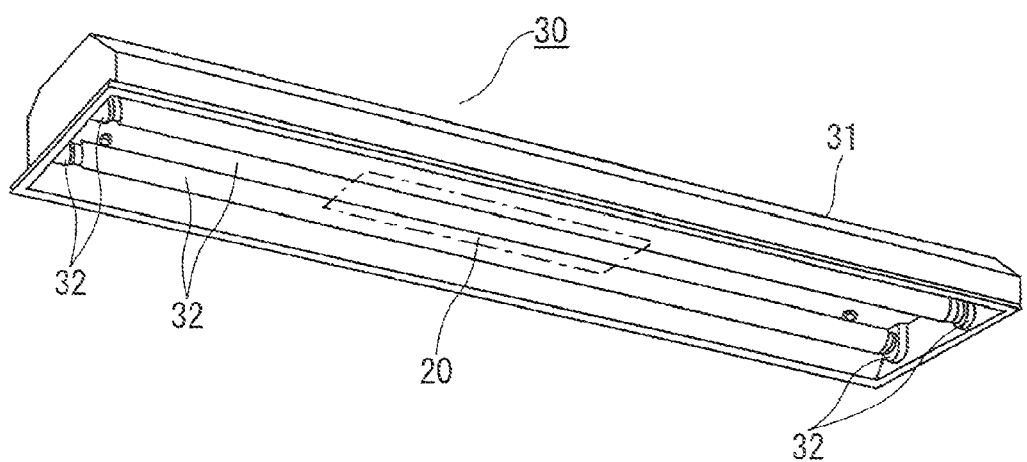
FIG. 24 is a perspective view illustrating a lighting equipment to which the lighting apparatus of FIG. 23 is applied.

As shown in FIG. 23 as block diagram of a lighting apparatus as an electric equipment and FIG. 24 is a perspective view illustrating a lighting equipment or lighting fixture applying the lighting apparatus.

With reference to FIG. 23, a lighting apparatus 20 as the electric equipment of the present invention includes a lighting circuit 21 as the electrical circuit. The lighting circuit 21 includes a filter circuit 22, a rectifying/smoothing circuit 23, a high frequency (i.e., radio-frequency) conversion circuit 24, and a lamp lighting circuit 25. A fluorescent lamp 26 as a lighting source is connected to the lamp lighting circuit 25.

The filter circuit 22 is connected to a commercial AC power source (AC) and functions to prevent malfunction of devices due to noise and damage to other devices. The rectifying/smoothing circuit 23 rectifies and smoothes the commercial alternating current. The high frequency conversion circuit 24 converts the direct current to a high frequency. The lamp lighting circuit 25 has a function to start the lamp and maintain the lighting.

The electrolytic capacitor 1 according to each of the respective embodiments of the characters and structures mentioned above is used and operatively connected to the rectifying/smoothing circuit 23.

In FIG. 24, the lighting equipment or fixture 30 is an embedded type equipment which is disposed on a room ceiling plane so as to be embedded therein. Sockets 32 are attached to both ends of the equipment body 31 in a longitudinal direction thereof. The straight fluorescent lamps 26 as the lighting source are connected to the sockets 32. The equipment body 31 houses the lighting apparatus 20.

When the commercial AC power source (AC) is supplied to the lighting apparatus 20, the electrolytic capacitor 1 of the rectifying/smoothing circuit 23 is electrically charged through the filter circuit 22, and the charged voltage is supplied to the fluorescent lamps 26 through the high frequency conversion circuit 24 as a high frequency voltage to light the fluorescent lamps 26.

In such lighting equipment, if the safety valve 6 of the electrolytic capacitor 1 is actuated and gas evaporated from the electrolyte solution is released, the cover member 10 can prevent the evaporated gas from flowing outside, and a user can be prevented from incorrectly identifying the gas as a fire. Moreover, since the cover member 10 is fixed to the main body case 2, it can not be detached by the releasing pressure of the evaporated gas. Therefore, the attached or mounted state of the cover member 10 can be reliably and surely maintained, thus stably achieving own function and performance thereof.

It is further to be noted that the present invention is not limited to the described embodiments and many other changes and modifications may be made without departing from the scopes of the appended claims.

For example, the electric equipment is not limited to the lighting apparatus, but may include a drive control apparatus for controlling a motor and may further include other electric equipments having an electric circuit using an electrolytic capacitor.

What is claimed is:

1. An electrolytic capacitor comprising:
a case including:
  a case body in which an electrolytic capacitor element is disposed in a sealed manner, the electrolytic capacitor element being filled with an electrolytic solution; and
  a safety valve mounted to the case body and configured to jet an evaporated gas of the electrolytic solution filling the electrolytic capacitor element;
a cover member mounted to the case configured to cover the safety valve mounted to the case, the cover member formed of an expansive material;
a first fixing unit mounted to the cover member configured to prevent the cover member from dismounting when the evaporated gas of the electrolytic solution is jetted outward; and
a second fixing unit disposed in association with the first fixing unit and configured to reinforce and assist a function of the first fixing unit to thereby prevent the cover member from being dismounted.

2. The electrolytic capacitor according to claim 1, wherein:
the case is a bottomed cylindrical shape and has an opening portion Opposite to the bottomed side;
the first fixing unit is a ring-shaped member for, fixing the cover member to the case and configured to be tightened from a peripheral side thereof; and
the second fixing unit is a thick wall portion formed on a peripheral edge of the opening portion.

3. The electrolytic capacitor according to claim 2, wherein:
a caulking portion is formed on an outer surface of the case, and the first fixing unit is attached to the case by the caulking portion; and
the thick wall portion has a thickness more than a distance between an inner diameter side of the ring shaped member and an outer surface side of the case body.

4. An electric equipment comprising:
a lighting circuit including circuit components; and
an electrolytic capacitor;
the electric capacitor including:
a case including:
  a case body in which an electrolytic capacitor element is disposed in a sealed manner, the electrolytic capacitor element being filled with an electrolytic solution; and
  a safety valve mounted to the case body and configured to jet an evaporated gas of the electrolytic solution filling the electrolytic capacitor element;
a cover member mounted to the case configured to cover the safety valve mounted to the case, the cover member formed of an expansive material;
a first fixing unit mounted to the cover member configured to prevent the cover member from dismounting when the evaporated gas of the electrolytic solution is jetted outward; and
a second fixing unit disposed in association with the first fixing unit and configured to reinforce and assist a function of the first fixing unit to thereby prevent the cover member from being dismounted.

* * * * *